United States Patent
Venkob et al.

(10) Patent No.: US 9,282,543 B2
(45) Date of Patent: *Mar. 8, 2016

(54) METHODS AND APPARATUS TO AVOID MOBILE STATION TRANSMISSION OF DUPLICATE EVENT-BASED AND POLLED ACKNOWLEDGMENTS

(71) Applicant: BlackBerry Limited, Waterloo (CA)

(72) Inventors: Satish Venkob, Waterloo (CA); Dennis Conway, Mississauga (CA); David Philip Hole, Slough (GB)

(73) Assignee: BlackBerry Limited, Waterloo, Ontario (CA)

(*) Notice: Subject to any disclaimer, the term of this patent is extended or adjusted under 35 U.S.C. 154(b) by 89 days.

This patent is subject to a terminal disclaimer.

(21) Appl. No.: 13/907,185

(22) Filed: May 31, 2013

(65) Prior Publication Data
US 2013/0258952 A1 Oct. 3, 2013

Related U.S. Application Data

(63) Continuation of application No. 12/551,161, filed on Aug. 31, 2009, now Pat. No. 8,457,048.

(51) Int. Cl.
*H04W 72/04* (2009.01)
*H04L 1/16* (2006.01)
*H04L 1/18* (2006.01)

(52) U.S. Cl.
CPC ......... *H04W 72/0406* (2013.01); *H04L 1/1685* (2013.01); *H04L 1/1848* (2013.01)

(58) Field of Classification Search
USPC .................................................. 370/228, 474
See application file for complete search history.

(56) References Cited

U.S. PATENT DOCUMENTS 7,849,218 B2   12/2010   Funabiki et al.
2006/0067333 A1*  3/2006   Sivakumar et al. ...... 370/395.52
(Continued)

FOREIGN PATENT DOCUMENTS

CN   102598761   7/2012
EP   2026504     2/2009
(Continued)

OTHER PUBLICATIONS

Chinese Intellectual Property Office, "Second Office Action", issued in connection with Chinese Patent Application No. 201080048822.7, dated Jul. 16, 2014 (5 pages).
(Continued)

*Primary Examiner* — Brandon Renner
(74) *Attorney, Agent, or Firm* — Fish & Richardson P.C.

(57) ABSTRACT

Methods and apparatus to avoid mobile station transmission of duplicate event-based and polled acknowledgments are disclosed. Example methods disclosed herein for a mobile station include determining whether an acknowledgment status of a first downlink data block classified as unreported is to be reported by a polled acknowledgment response to be sent in response to a poll received from a network, sending event-based acknowledgment information to report the acknowledgment status of the first downlink data block after determining that the acknowledgment status of the first downlink data block is not to be reported by the polled acknowledgment response, and refraining from sending the event-based acknowledgment information to report the acknowledgment status of the first downlink data block after determining that the acknowledgment status of the first downlink data block is to be reported by the polled acknowledgment response.

20 Claims, 9 Drawing Sheets

(56) References Cited

U.S. PATENT DOCUMENTS

| | | | |
|---|---|---|---|
| 2007/0037564 | A1 | 2/2007 | Imamura et al. |
| 2008/0056303 | A1 | 3/2008 | Sebire et al. |
| 2008/0177884 | A1 | 7/2008 | Agarwal |
| 2009/0098866 | A1 | 4/2009 | Timner et al. |
| 2009/0119564 | A1 | 5/2009 | Sagfors et al. |
| 2009/0207820 | A1* | 8/2009 | Dimou .................. H04L 1/1854 370/338 |
| 2009/0210539 | A1 | 8/2009 | Funabiki et al. |
| 2009/0276674 | A1 | 11/2009 | Wei et al. |
| 2010/0020689 | A1* | 1/2010 | Tang ....................... H04L 47/10 370/235 |
| 2010/0105334 | A1 | 4/2010 | Terry et al. |
| 2010/0177701 | A1 | 7/2010 | Maheshwari et al. |
| 2011/0007697 | A1* | 1/2011 | Ryu et al. ...................... 370/329 |
| 2011/0051661 | A1 | 3/2011 | Venkob et al. |

FOREIGN PATENT DOCUMENTS

| | | |
|---|---|---|
| EP | 2290862 | 3/2011 |
| JP | 2002-537723 | 11/2002 |
| JP | 2006-311517 | 11/2006 |
| JP | 2008-028810 | 2/2008 |
| JP | 2013503505 | 1/2013 |
| KR | 1020120050491 | 5/2012 |
| WO | 00/49761 | 8/2000 |
| WO | 0049761 | 8/2000 |
| WO | 2007063393 | 6/2007 |
| WO | 2007120107 | 10/2007 |
| WO | 2008029210 | 3/2008 |
| WO | 2008141016 | 11/2008 |
| WO | 2009035300 | 3/2009 |

OTHER PUBLICATIONS

IP Australia, "Notice of Acceptance", issued in connection with Australian Patent Application No. 2010286289, dated Aug. 1, 4014 (2 pages).

Canadian Intellectual Property Office, "Office Action", issued in connection with Canadian Patent Application No. 2,772,667, dated Feb. 28, 2014 (2 pages).

Chinese Intellectual Property Office, "First Office Action", issued in connection with Chinese Patent Application No. 201080048822.7, dated Mar. 4, 2014 (19 pages).

3GPP, "Radio Link Control/Medium Access Control (RLC/MAC) protocol", Technical Specification Group GSM/EDGE Radio Access Network, 3GPP TS 44.060 V9.0.0 (Release 9), dated May 31, 2009 (Excerpt, 7 pages).

3GPP, "3GPP TS 44.060 Technical Specification," Version 7.17.0, May 2009 (565 pages).

Hussain et al., "A Simple Cross-Layer Approach to Reduce Duplicate Acknowledgements for TCP over WLAN," IEEE, 2008 (4 pages).

Paul et al., "An Asymmetric Protocol for Digital Cellular Communications," AT&T Bell Laboratories, Holmdel, NJ, IEEE, 1995 (10 pages).

PCT, "International Search Report and Written Opinion," issued in connection with International Application No. PCT/CA2010/001308, mailed on Dec. 2, 2010 (7 pages).

PCT, "International Preliminary Report on Patentability," issued in connection with International Application No. PCT/CA2010/001308, mailed on Mar. 15, 2012 (6 pages).

USPTO, "Office Action," issued in connection with U.S. Appl. No. 12/551,161, dated May 17, 2012 (13 pages).

USPTO, "Office Action," issued in connection with U.S. Appl. No. 12/551,161, dated Sep. 17, 2012 (7 pages).

USPTO, "Notice of Allowance," issued in connection with U.S. Appl. No. 12/551,161, dated Feb. 4, 2013 (11 pages).

Korean Intellectual Property Office, "Office Action," issued in connection with Korean Application No. 10-2012-7007477, on Aug. 21, 2013, 10 pages.

Korean Intellectual Property Office, "Notice of Allowance," issued in connection with Korean Application No. 10-2012-7007477, on Nov. 20, 2013, 3 pages.

IP Australia, "Examination Report," issued in connection with Australian Application No. 2010286289, on Nov. 15, 2013, 5 pages.

Japanese Intellectual Property Office, "Notice of Allowance," issued in connection with Japanese Application No. 2012-525829, dated Nov. 1, 2013, 3 pages.

European Patent Office, "Extended European Search Report," issued in connection with European Application No. 09175716.1, dated Oct. 23, 2013, 7 pages.

Chinese Intellectual Property Office, "Second Office Action", issued in connection with Chinese Patent Application No. 201080048822.7, dated Jul. 16, 2014 (13 pages).

Canadian Intellectual Property Office, "Office Action", issued in connection with Canadian Patent Application No. 2,772,667, dated Aug. 14, 2014 (2 pages).

Chinese Intellectual Property Office, "Third Office Action", issued in connection with Chinese Patent Application No. 201080048822.7, dated Oct. 21, 2014 (9 pages).

State Intellectual Property Office of People's Republic of China, "Third Office Action", issued in connection with Chinese Patent Application No. 201080048822.7, dated Oct. 21, 2014 (23 pages).

Japanese Intellectual Property Office, "Office Action," issued in connection with Japanese Application No. 2012-525829, dated Jul. 10, 2013, 5 pages (with English translation).

\* cited by examiner

METHODS AND APPARATUS TO AVOID
MOBILE STATION TRANSMISSION OF
DUPLICATE EVENT-BASED AND POLLED
ACKNOWLEDGMENTS

RELATED APPLICATION(S)

This patent arises from a continuation of U.S. patent application Ser. No. 12/551,161 (now U.S. Pat. No. 8,457,048), entitled "METHODS AND APPARATUS TO AVOID MOBILE STATION TRANSMISSION OF DUPLICATE EVENT-BASED AND POLLED ACKNOWLEDGMENTS" and filed on Aug. 31, 2009. U.S. patent application Ser. No. 12/551,161 is hereby incorporated by reference in its entirety.

FIELD OF THE DISCLOSURE

This disclosure relates generally to mobile station transmission processing and, more particularly, to methods and apparatus to avoid mobile station transmission of duplicate event-based and polled acknowledgments.

BACKGROUND

Many communications systems employ automatic repeat request (ARQ) techniques that allow a transmitter to confirm that data transmissions have been received successfully by an intended receiver. A typical ARQ technique involves the receiver responding to the transmitter with acknowledgment information for each received data block, with the acknowledgment information identifying the data block being acknowledged. The acknowledgment information may include a positive acknowledgment (referred to herein as an "ACK") indicating that reception of the data block was successful, a negative acknowledgment (referred to herein as a "NACK") indicating that reception of the data block was unsuccessful, as well as any other appropriate acknowledgment information. For example, in an enhanced general packet radio service (EGPRS) communication system, a receiver can acknowledge receipt of radio link control (RLC) data blocks using RLC/MAC control messages (where MAC refers to medium access control), such as an EGPRS packet downlink ACK/NACK (PDAN) control message or a packet uplink ACK/NACK control message.

In the case of a bidirectional communications system, such as an EGPRS system, the latency associated with using separate control messages to send acknowledgment information can be reduced (without significantly decreasing the bandwidth available for data transmission) by including such acknowledgment information with data blocks to be transmitted in the opposite direction. For example, EGPRS supports such latency reduction through its fast ACK/NACK reporting (FANR) procedure. The FANR procedure allows acknowledgment information to be piggy-backed with an RLC/MAC data block subsequently sent from a receiving unit to a transmitting unit through use of a piggy-backed ACK/NACK (PAN) field. EGPRS mobile stations can support two types of FANR procedures, namely, polled FANR and event-based FANR. Additionally, EGPRS mobile stations are able to respond to polls requesting acknowledgment information to be sent using PDAN control messages instead of PAN fields. In some scenarios, a conventional EGPRS mobile station will send duplicate acknowledgment information generated by these different acknowledgment procedures.

DETAILED DESCRIPTION

Figure 1:
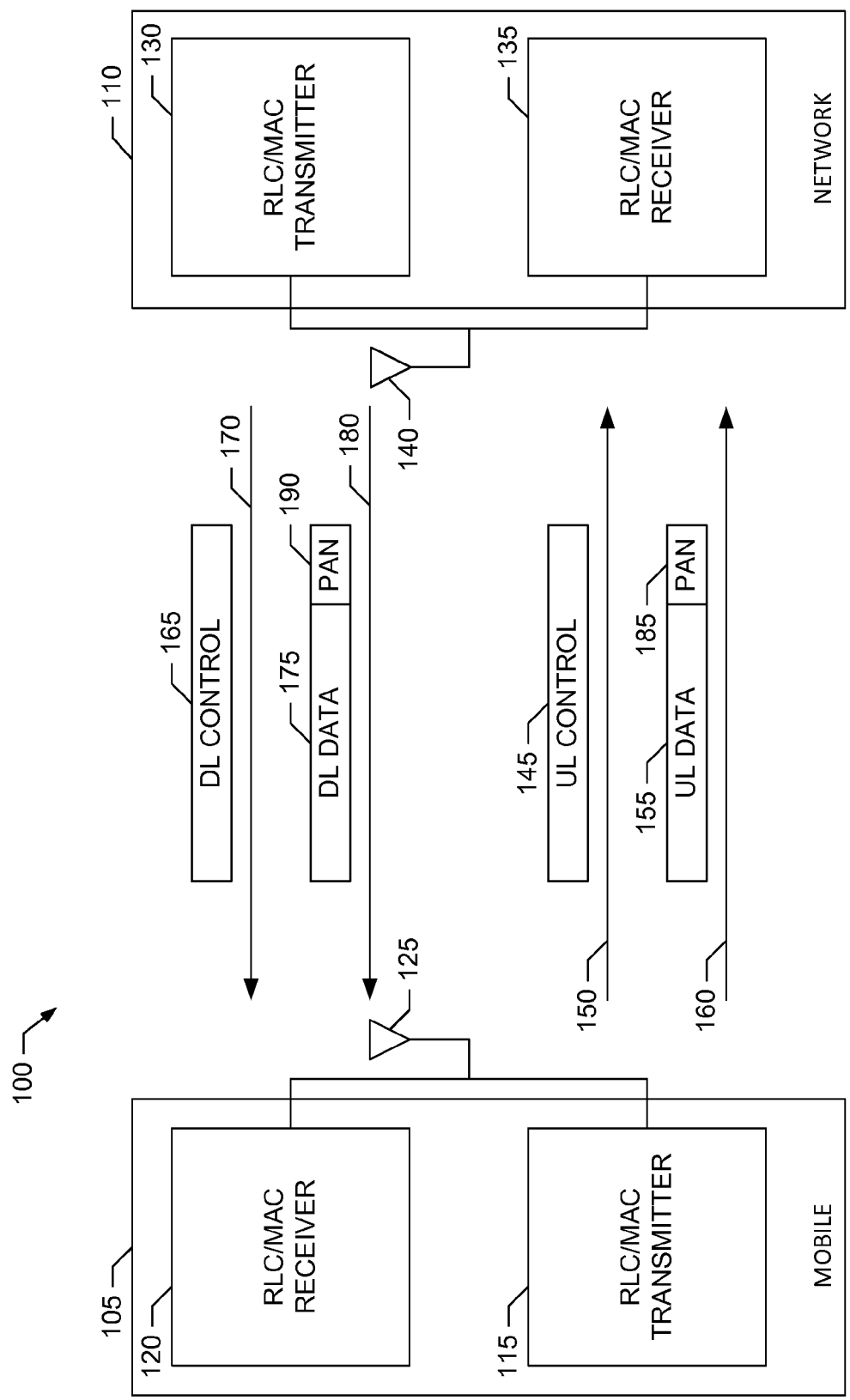
FIG. 1 is a block diagram of an example EGPRS communication system capable of supporting the methods and apparatus described herein.

Methods and apparatus to avoid mobile station transmission of duplicate event-based and polled acknowledgments are disclosed herein. A first example duplicate acknowledgment avoidance technique disclosed herein involves an example mobile station being configured to send event-based acknowledgment information (e.g., acknowledgment information generated proactively to report unreported missing downlink data blocks). The technique then involves the mobile station classifying a downlink (DL) data block as unreported (e.g., when the mobile station initially determines that the DL data block is missing). The technique also involves the mobile station receiving a poll from a network requesting the mobile station to send polled acknowledgment information (e.g., acknowledgment information sent in response to the poll from the network) during a period (e.g., such as a radio block period). Furthermore, this technique involves the mobile station refraining from sending during the period event-based acknowledgment information for the DL data block classified as unreported.

In a second example duplicate acknowledgment avoidance technique disclosed herein, an example mobile station includes an event-based acknowledgment processor to generate event-based acknowledgment for a DL data block classified as unreported. The mobile station implementing this technique also includes a polled acknowledgment processor to generate polled acknowledgment information in response to a poll received from a network. Furthermore, the mobile station implementing this technique includes an acknowledgment transmission unit to refrain from sending the event-based acknowledgment information during the period when the polled acknowledgment information is also to be sent during the period.

As described in greater detail below, in a particular example implementation of either of the preceding techniques, the mobile station and the network may support EGPRS FANR, which includes a polled FANR procedure and an event-based FANR procedure. In such an example EGPRS implementation, the network may poll the mobile station to respond with acknowledgment information for DL data blocks previously sent by the network to the mobile station. The DL acknowledgment information may take the form of a reported bitmap (RB) field including a set of acknowledgment bits, with each bit providing an ACK or NACK indication for a respective received data block being acknowledged by the RB.

In an EGPRS implementation conforming to third generation partnership project (3GPP) Release 7, the network may implement the poll by setting bits in a combined EGPRS supplementary/polling (CES/P) field included with a DL data block sent to the mobile station. The bits in the CES/P field are set to indicate whether the DL acknowledgment information is to be provided via a PAN field generated using the polled FANR procedure and sent with an uplink (UL) data block destined for the network, or via a PDAN control message. The CES/P field can also be used to indicate during which radio block period the mobile station should respond with the polled acknowledgment information.

Additionally or alternatively, the mobile station in such an example EGPRS implementation may be commanded by the network to use the event-based FANR procedure to proactively send DL acknowledgment information regardless of whether a poll is received from the network. In fact, if the event-based FANR procedure is enabled, the mobile station is generally expected to report any missing DL data blocks at the earliest opportunity using a PAN field sent with an UL data block destined for the network. For example, the mobile station is able to determine whether DL data blocks transmitted by the network are missing (e.g., not received, received out-of-order, received with errors, etc.) by decoding a block sequence number (BSN) transmitted with each data block. The mobile station classifies missing data blocks as either UNREPORTED or REPORTED. A missing data block is classified as UNREPORTED when the missing data block has been initially detected and its acknowledgment status has not yet been reported to the network. The missing data block is then classified as REPORTED when its acknowledgment status is reported to the network in any manner (e.g., via a polled PAN, an event-based PAN, a PDAN control message, etc.). If event-based FANR is enabled, the mobile station is generally required to report DL acknowledgment information (e.g., such as in the form of an RB field) via PAN fields generated by the event-based FANR procedure and sent with associated UL data blocks destined for the network while any missing DL data blocks are classified as UNREPORTED. Furthermore, if event-based FANR is enabled, the mobile station is required to send an event-based PAN reporting a particular UNREPORTED missing DL data block during the second radio block period following the block period in which the particular DL data block was initially detected as missing.

As described in greater detail below, mobile stations supporting the EGPRS FANR feature along with the example duplicate acknowledgment avoidance techniques described herein exhibit substantial benefits over conventional mobile stations. For example, a conventional EGPRS mobile station conforming to 3GPP Release 7 with event-based FANR enabled typically sends an event-based PAN when any missing DL data blocks are classified as UNREPORTED regardless of whether the acknowledgment status of these missing DL data blocks will also be reported during the same radio block period by a polled PAN or a PDAN control message sent in response to a network poll. Such conventional operation can result in redundant acknowledgment information being sent to the network during the same radio block period, thereby wasting precious bits/bandwidth that could otherwise be used for UL data transmission.

Unlike such conventional implementations, an EGPRS mobile station supporting the example duplicate acknowledgment avoidance techniques described herein can refrain from sending an event-based PAN (or an event-based PDAN control message generated when there is no UL data to send with the event-based PAN) to report any missing DL data blocks being classified as UNREPORTED if the mobile station determines that the acknowledgment status of these missing DL data blocks will also be timely reported (or the acknowledgment status has a substantial likelihood of also being timely reported) by a polled PAN or a PDAN control message sent in response to a network poll. Using the techniques described herein to refrain from sending the duplicate acknowledgment information that would have been conveyed by the event-based PAN frees valuable bits/bandwidth that can be used to send more UL RLC/MAC data or existing UL RLC/MAC data more robustly (e.g., with a higher error correction coding rate, such as corresponding to a EGPRS lower modulation and coding scheme (MCS)). In this way, the example duplicate acknowledgment avoidance techniques described herein are able to improve UL spectral efficiency as compared to conventional acknowledgment processing techniques.

Turning to the figures, a block diagram of an example EGPRS communication system 100 capable of supporting the duplicate acknowledgment avoidance techniques described herein is illustrated in FIG. 1. The EGPRS system 100 includes an example mobile station 105 in communication with an example network element 110. The mobile station 105 may be implemented by any type of mobile station or user endpoint equipment, such as a mobile telephone device, a fixed telephone device, a personal digital assistant (PDA), etc. The network element 110 may be implemented by any type of network communication device, such as a base station system, a radio access network, etc. As described in greater detail below, the mobile station 105 implements duplicate acknowledgment avoidance as described herein to refrain from sending duplicate DL acknowledgment information generated via an event-based FANR procedure when the acknowledgment information is also to be timely reported or has a substantial likelihood of also being timely reported via a polled FANR procedure or a PDAN control message sent in response to a network poll. Although only one mobile station 105 and one network element 110 are illustrated in FIG. 1, the EGPRS system 100 can support any number of mobile stations 105 and network elements 110.

The mobile station 105 of FIG. 1 includes an example RLC/MAC transmitter 115 and an example RLC/MAC receiver 120, each communicatively coupled to an antenna 125. Similarly, the network element 110 of FIG. 1 includes an example RLC/MAC transmitter 130 and an example RLC/MAC receiver 135, each communicatively coupled to an antenna 140. The RLC/MAC transmitter 115 included in the mobile station 105 sends UL RLC and MAC information wirelessly via the example antenna 125 for reception via the example antenna 140 by the RLC/MAC receiver 135 included in the network element 110. As illustrated in FIG. 1, the UL RLC and MAC information transmitted by the RLC/MAC transmitter 115 to the RLC/MAC receiver 135 includes UL RLC/MAC control messages 145 (e.g., such as EGPRS PDAN control messages 145 discussed in greater detail below) transmitted via corresponding UL physical control channels 150, or UL RLC/MAC data blocks 155 transmitted via corresponding UL physical data channels 160. Although FIG. 1 depicts transmission of only one UL RLC/MAC data block 155, depending on a particular operating scenario, one or more UL RLC/MAC data blocks 155 may be transmitted via the appropriate UL physical data channel 160. Additionally, an RLC/MAC header (not shown) including, for example, the BSN(s) of the one or more UL RLC/MAC data blocks 155 may also be transmitted with the one or more UL RLC/MAC data blocks 155. Furthermore, an optional PAN field 185 described in greater detail below may be transmitted with the one or more UL RLC/MAC data blocks 155.

Referring again to FIG. 1, the RLC/MAC transmitter 130 included in the network element 110 sends DL RLC and MAC information wirelessly via the antenna 140 for reception via the antenna 125 by the example RLC/MAC receiver 120 included in the mobile station 105. As illustrated in FIG. 1, the DL RLC and MAC information transmitted by the RLC/MAC transmitter 130 to the RLC/MAC receiver 120 includes DL RLC/MAC control messages 165 (e.g., such as packet uplink ACK/NACK control messages 165) transmitted via corresponding DL physical control channels 170, or DL RLC/MAC data blocks 175 transmitted via corresponding DL physical data channels 180. Although FIG. 1 depicts transmission of only one DL RLC/MAC data block 175 depending on a particular operating scenario, one or more DL RLC/MAC data blocks 175 may be transmitted via the appropriate DL physical data channel 180. Additionally, an RLC/MAC header (not shown) including, for example, the BSN(s) of the one or more DL RLC/MAC data blocks 175, as well as a CES/P field described in greater detail below, may also be transmitted with the one or more DL RLC/MAC data blocks 175. Furthermore, an optional PAN field 190 described in greater detail below may be transmitted with the one or more DL RLC/MAC data blocks 175.

The EGPRS system 100 implements various ARQ techniques to confirm that a transmitted RLC/MAC data block is received successfully by its intended recipient. Accordingly, to acknowledge DL transmissions, one of the UL RLC/MAC control messages 145 capable of being sent by the mobile station's RLC/MAC transmitter 115 is an EGPRS PDAN control message 145 providing ACK indications for DL RLC/MAC data blocks 175 received successfully by the mobile station's RLC/MAC receiver 120. Additionally, the EGPRS PDAN control message 145 sent by the mobile station's RLC/MAC transmitter 115 provides NACK indications for DL RLC/MAC data blocks 175 not received successfully by the mobile station's RLC/MAC receiver 120.

Similarly, to acknowledge UL transmissions, one of the DL RLC/MAC control messages 165 capable of being sent by the network element's RLC/MAC transmitter 130 is a packet uplink ACK/NACK control message 165 providing ACK indications for UL RLC/MAC data blocks 155 received successfully by the network element's RLC/MAC receiver 135. Additionally, the packet uplink ACK/NACK control message 165 sent by the network element's RLC/MAC transmitter 130 provides NACK indications for UL RLC/MAC data blocks 155 not received successfully by the network element's RLC/MAC receiver 135.

The EGPRS system 100 also implements the FANR feature to provide acknowledgment information with reduced latency. Without FANR, all acknowledgements of received RLC/MAC data blocks would need to be sent using control messages, such as EGPRS PDAN control messages 145, packet uplink ACK/NACK control messages 165, etc. Such control messages do not include any RLC data, although they may include other RLC/MAC control information besides acknowledgement information. The disadvantage of using only control messages to send acknowledgment information is that such an approach can be quite inefficient, particularly when acknowledgement information needs to be sent quickly (e.g. in order to allow fast retransmissions of erroneously received blocks) or when the status of very few blocks needs to be indicated (e.g. in low bandwidth transmissions). In such scenarios, the amount of acknowledgement information that is actually useful is very small compared to the capacity of an RLC/MAC control message.

To reduce latency, the FANR feature allows acknowledgment information to be transmitted in a PAN field included with the transmission of an RLC/MAC data block. In the illustrated example of FIG. 1, acknowledgment information for reception of the DL RLC/MAC data blocks 175 is included in an UL PAN field 185 (also referred to herein as an UL PAN 185) transmitted with the corresponding UL RLC/MAC data block 155. Similarly, acknowledgment information for reception of the UL RLC/MAC data blocks 155 is included in a DL PAN field 190 (also referred to herein as a DL PAN 190) transmitted with the corresponding DL RLC/MAC data block 175. As specified by the EGPRS standards, the UL PAN 185 includes an RB field providing a set of acknowledgment bits, with each bit providing an ACK or NACK indication for a respective received DL data block being acknowledged by the RB. The UL PAN 185 also includes a short starting sequence number (ShortSSN) related to the BSN of the DL data block corresponding to the first data block included in the set of DL data blocks covered by the RB field. The UL PAN 185 further includes a beginning of window (BOW) field to indicate whether the ShortSSN field indicates the identity of the DL data block corresponding to the beginning of the receive window maintained by the receiver providing the acknowledgment information.

As specified by the EGPRS standards, the DL PAN 190 can employ SSN-based encoding or time-based coding. In the case of SSN-based encoding, the DL PAN 190 includes an RB field, a ShortSSN field and a BOW field as described above for the UL PAN 185. In the case of time-based encoding, the DL PAN 190 includes the RB field, with the particular UL data blocks being acknowledged determined based on the time the DL PAN 190 is sent.

To support FANR, the mobile station 105 of FIG. 1 implements both the polled FANR procedure and the event-based FANR procedure specified in 3GPP Release 7 as mentioned above. In an example polled FANR operation, the network element 110 polls the mobile station 105 to provide DL acknowledgment information in the UL PAN 185 accompanying a subsequent UL RLC/MAC data block 155 (e.g., to allow transmitted DL blocks NACK'ed by the mobile station to be quickly retransmitted). (When generated by the polled FANR procedure in response to a network poll, an UL PAN is referred to herein as a polled PAN.) Then, after completing transmission of the DL data blocks in its transmit window, the network element 110 polls the mobile station 105 to provide DL acknowledgment information in a separate EGPRS PDAN control message 145 to confirm successful receipt of the DL data blocks. Furthermore, when the mobile station 105 is polled to provide DL acknowledgment information in a polled PAN 185, but the mobile station 105 has no UL RLC/MAC data blocks 155 to send, the mobile station 105 can respond to the poll with a PDAN control message 145 instead of the polled PAN 185, thereby providing early confirmation of the DL data blocks and allowing the network element 110 to advance its transmit window.

As mentioned above, the network element 110 can implement its polls for DL acknowledgment information by setting bits in CES/P fields included with DL RLC/MAC data blocks 175 sent to the mobile station 105. For example, the network element 110 can configure the CES/P fields of one or more DL RLC/MAC data blocks 175 to indicate that the DL acknowledgment information is to be provided via a polled PAN 185 generated using the polled FANR procedure and sent with an UL data block 155 destined for the network element 110. Alternatively, the network element 110 can configure the CES/P fields of one or more DL RLC/MAC data blocks 175 to indicate that the DL acknowledgment information is to be provided via an EGPRS PDAN control message 145. The network element 110 can also use the CES/P fields to indicate during which radio block period after transmission of the associated one or more DL RLC/MAC data blocks 175 the mobile station 105 is to respond with the requested polled PAN 185 or EGPRS PDAN control message 145.

Additionally, the mobile station 105 implements the event-based FANR procedure to proactively send DL acknowledgment information regardless of whether a poll is received from the network element 110. In particular, the mobile station 105 is able to determine whether DL RLC/MAC data blocks 175 transmitted by the network element 110 are missing (e.g., not received, received out-of-order, received with errors, etc.) by decoding a BSN transmitted with each data block 175. The mobile station 105 maintains a receive state array, V(N), to track the status of DL RLC/MAC data blocks 175, with each element in the receive state array V(N) associated with a respective DL RLC/MAC data block 175. For example, when a DL RLC/MAC data block 175 is received successfully, the mobile station 105 classifies the state of the DL RLC/MAC data block 175 as RECEIVED by setting the element in the receive state array V(N) associated with the DL RLC/MAC data block 175 to a value representative of the RECEIVED state. A missing DL RLC/MAC data block 175 is classified by the mobile station 105 as having a state of either UNREPORTED or REPORTED by setting the element in the receive state array V(N) associated with the missing DL RLC/MAC data block 175 to either a value representative of the UNREPORTED state or a value representative of the REPORTED state.

For example, the mobile station 105 classifies a missing DL RLC/MAC data block 175 as UNREPORTED when the missing data block is initially detected as missing and its acknowledgment status has not yet been reported to the network element 110. The missing DL RLC/MAC data block 175 is then classified as REPORTED when the mobile station 105 reports its acknowledgment status to the network element 110 (e.g., via an UL PAN 185, a PDAN control message 145, etc.). If event-based FANR is enabled, the mobile station 105 proactively reports DL acknowledgment information while any DL RLC/MAC data blocks 175 are classified as UNREPORTED in the receive state array V(N), with the DL acknowledgment information being reported via an UL PAN 185 generated by the event-based FANR procedure and sent with associated UL RLC/MAC data blocks 155 destined for the network element 110. (When generated proactively by the event-based FANR procedure, an UL PAN is referred to herein as an event-based PAN.) Generally, the mobile station 105 operates to send such an event-based PAN 185 reporting a particular UNREPORTED missing DL RLC/MAC data block 175 during the second radio block period following the block period in which the particular DL data block was initially detected as missing. Furthermore, when the mobile station 105 generates event-based DL acknowledgment information to be provided in the event-based PAN 185, but the mobile station 105 has no UL RLC/MAC data blocks 155 to send, the mobile station 105 can send the event-based DL acknowledgment information via a PDAN control message 145 instead of the event-based PAN 185.

The mobile station 105 also implements one or more of the duplicate acknowledgment avoidance techniques described herein to refrain from sending duplicate DL acknowledgment information generated via the event-based FANR procedure and generated in response to a poll from the network element 110. As mentioned above, a conventional EGPRS mobile station typically sends an event-based PAN (or event-based PDAN control message instead of the event-based PAN) when any missing DL data blocks are classified as UNREPORTED regardless of whether the acknowledgment status of these missing DL data blocks will also be reported during the same radio block period by a polled PAN or a PDAN control message sent in response to a network poll. In contrast, the mobile station 105 avoids sending such duplicate acknowledgment information, at least in some circumstances, by not sending an event-based PAN 185 (or an event-based PDAN control message 145 instead of the event-based PAN 185) if the mobile station 105 determines that the acknowledgment status of the UNREPORTED missing DL data blocks is to be timely reported by a polled PAN 185 or a PDAN control message 145 sent in response to a poll received from the network element 110.

In a first example, the mobile station 105 refrains from sending such an event-based PAN 185 so long as a polled PAN 185 or a PDAN control message 145 is to be sent by the mobile station 105 during the same radio block period as the event-based PAN 185 would have been sent. In a second example, the mobile station 105 evaluates one or more acknowledgment omission criteria to determine whether to refrain from sending an event-based PAN 185 that duplicates acknowledgment information to be sent by a polled PAN 185 or a PDAN control message 145 in the same radio block period. An example implementation of duplicate acknowledgment avoidance in the mobile station 105 is illustrated in FIG. 2 and discussed in greater detail below.

Although the duplicate acknowledgment avoidance methods and apparatus disclosed herein are described in the context of the EGPRS system 100 of FIG. 1, these example methods and apparatus can be readily adapted for use in any communication system in which acknowledgment information can be provided both proactively via an event-based procedure and also in response to a poll requesting acknowledgment information. Furthermore, although the example methods and apparatus disclosed herein are described from the perspective of implementation by the mobile station 105, in a communication system in which the mobile station 105 can poll the network element 110 for acknowledgment information, the disclosed example methods and apparatus could also be implemented by the network element 110 due the symmetry of the RLC/MAC transmitters and receivers included in the mobile station 105 and the network element 110.

Figure 2:
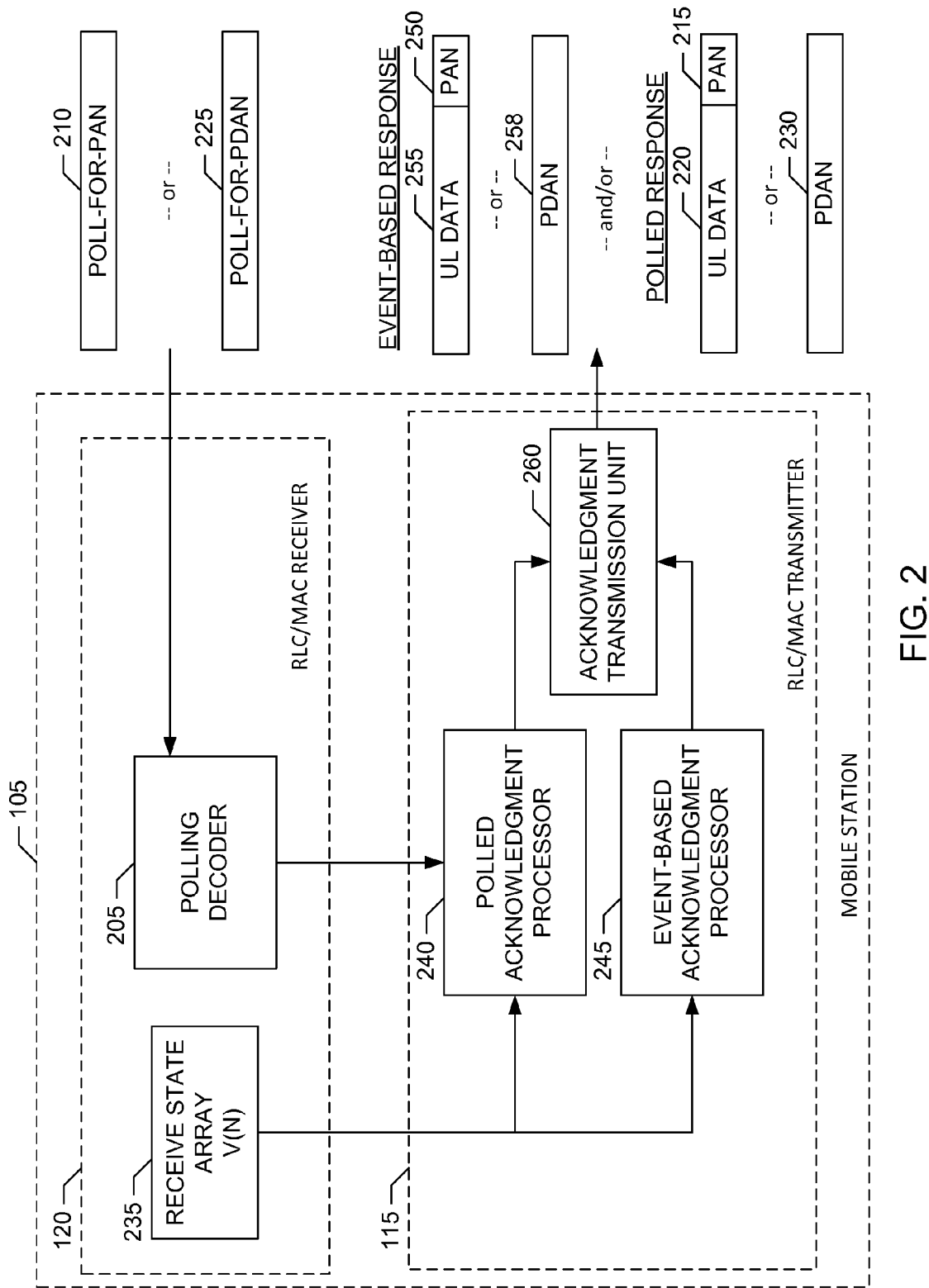
FIG. 2 is a block diagram of an example mobile station implementing duplicate acknowledgment avoidance according to the methods and apparatus described herein that may be used in the example EGPRS communication system of FIG. 1.

A block diagram of an example implementation of the mobile station 105 included in the EGPRS system 100 of FIG. 1 is illustrated in FIG. 2. In particular, FIG. 2 illustrates example implementations of the mobile station's RLC/MAC transmitter 115 and the mobile station's RLC/MAC receiver 120. In the illustrated example of FIG. 2, and with reference to FIG. 1, the mobile station's RLC/MAC receiver 120 includes a polling decoder 205 to decode polling messages received from a network element (e.g., such as the network element 110) requesting that the mobile station 105 provide acknowledgment status for DL data blocks (e.g., such as the DL RLC/MAC data block 175) previously transmitted by the network. For example, to implement the EGPRS polled FANR feature, the polling decoder 205 may decode a received poll-for-PAN message 210 requesting that the mobile station 105 provide such acknowledgment information in a polled PAN field 215 (e.g., corresponding to the PAN field 185) accompanying UL data blocks 220 (e.g., such as the UL RLC/MAC data blocks 155) to be transmitted to the network. As another example, the polling decoder 205 may decode a received poll-for-PDAN message 225 requesting that the mobile station 105 provide such acknowledgment information in a separate EGPRS PDAN control message 230 (e.g., corresponding to the EGPRS PDAN control message 145). In an example implementation, the poll-for-PAN message 210 and the poll-for-PDAN message 225 are implemented by the CES/P fields included with DL data blocks, as described above.

The RLC/MAC receiver 120 of FIG. 2 also includes a receive state array 235 to track the status of a set (e.g., a sequence) of DL data blocks (e.g., such as the DL RLC/MAC data blocks 175) sent to the mobile station 105 by the network. As described above, each element of the receive state array 235 (also referred to as V(N) herein and in the figures) is associated with a respective DL data block in the set of DL data blocks sent to the mobile station 105 by the network. An element of the receive state array 235 can take on a value representative of at least one of the following states: a RECEIVED state, an UNREPORTED state and a REPORTED state. A particular element of the receive state array 235 is set to RECEIVED when the DL data block associated with the array element is received successfully by the mobile station 105. Conversely, the particular element of the receive state array 235 is initially set to UNREPORTED when the associated DL data block is expected to be received from the network (e.g., based on tracking BSNs included with DL data blocks) but is initially detected as missing and acknowledgment information (e.g., such as a NACK) has not yet been reported to the network. This element of the receive state array 235 is then set to REPORTED when the acknowledgment information (e.g., such as a NACK) for the associated missing DL data block is subsequently reported to the network.

The mobile station's RLC/MAC transmitter 115 of FIG. 2 includes a polled acknowledgment processor 240 to process received polling messages decoded by the polling decoder 205 and to generate appropriate polled responses. When a poll-for-PDAN message 225 is decoded by the polling decoder 205, the polled acknowledgment processor 240 evaluates the status information maintained by the receive state array 235 and generates appropriate DL polled acknowledgment information for inclusion in a PDAN control message 230 to be sent in response to the network's poll. For example, the polled acknowledgment processor 240 may generate DL polled acknowledgment information in the form of an ACK/NACK field that reports ACKs for all DL data blocks whose associated elements of the receive state array 235 are set to RECEIVED, and NACKs for all DL data blocks whose associated elements of the receive state array 235 are set to UNREPORTED or REPORTED. In an EGPRS implementation, the ACK/NACK reported bitmap for both polled PAN and PDAN responses starts at the BSN equal to V(Q)+1, where V(Q) denotes the lowest BSN not yet received and, thus, indicates the start of the mobile station's received window. Additionally, the polled acknowledgment processor 240 schedules the generated PDAN control message 230 for transmission during an UL radio block period indicated by the decoded poll-for-PDAN message 225.

However, when a poll-for-PAN message 210 is decoded by the polling decoder 205, the polled acknowledgment processor 240 in an example implementation implements the EGPRS polled FANR procedure. In such an example, the polled acknowledgment processor 240 evaluates the status information maintained by the receive state array 235 and generates appropriate DL polled acknowledgment information for inclusion in a polled PAN 215 to be sent in response to the network's poll. For example, the polled acknowledgment processor 240 may generate DL polled acknowledgment information in the form of an RB field for inclusion in the polled PAN 215. As described above, the RB field includes a set of acknowledgment bits, with each bit providing an ACK indication for a respective received DL data block and a NACK indication for a respective missing DL data block being acknowledged by the RB. Along with generating the RB field, the polled acknowledgment processor 240 may also generate the appropriate SSN and BOW fields for inclusion in the polled PAN 215. Additionally, the polled acknowledgment processor 240 schedules the generated polled PAN 215 for transmission during an UL radio block period indicated by the decoded poll-for-PAN message 210.

The RLC/MAC transmitter 115 of FIG. 2 further includes an event-based acknowledgment processor 245 to proactively send DL acknowledgment information regardless of whether a poll (e.g., such as a poll-for-PAN message 210 or a poll-for-PDAN message 225) is received from the network. In an example implementation, the event-based acknowledgment processor 245 implements the EGPRS event-based FANR procedure. In such an example, the event-based acknowledgment processor 245 automatically processes the receive state array 235 after it is updated at the end of a preceding DL radio block period to determine whether any DL data blocks are classified as UNREPORTED. If event-based FANR is enabled in the mobile station 105, the event-based acknowledgment processor 245 automatically evaluates the status information maintained by the receive state array 235 and generates appropriate DL event-based acknowledgment information for inclusion in an event-based PAN 250 (e.g., corresponding to the PAN field 185) accompanying UL data blocks 255 (e.g., such as the UL RLC/MAC data blocks 155) to be transmitted to the network. Alternatively, the event-based acknowledgment processor 245 can generate the appropriate DL event-based acknowledgment information for inclusion in an event-based PDAN control message 258 if the mobile station 105 has no UL data block 255 to send.

For example, similar to operation of the polled acknowledgment processor 240, the event-based acknowledgment processor 245 may generate DL event-based acknowledgment information in the form of an RB field for inclusion in the event-based PAN 250 (or the event-based PDAN control message 258), with each bit in the RB providing an ACK indication for a respective received DL data block and a NACK indication for a respective missing DL data block being acknowledged by the RB. Along with generating the RB field, the event-based acknowledgment processor 245 may also generate the appropriate ShortSSN and BOW fields for inclusion in the event-based PAN 250 (or the event-based PDAN control message 258). Additionally, the event-based acknowledgment processor 245 schedules the generated PAN 250 (or the event-based PDAN control message 258) for transmission during the second (or some other specified) UL radio block period after initially determining that the receive state array 235 classified at least one DL data block as UNREPORTED.

The RLC/MAC transmitter 115 included in the mobile station 105 of FIG. 2 also includes an acknowledgment transmission unit 260 to implement duplicate acknowledgment avoidance as described herein. For example, for a given uplink radio block period, the acknowledgment transmission unit 260 obtains from the event-based acknowledgment processor 245 any event-based PAN field 250 (or any event-based PDAN control message 258) to be sent during the given uplink radio block period. Additionally, the acknowledgment transmission unit 260 obtains from the polled acknowledgment processor 240 any polled response, such as any polled PAN 215 or PDAN control message 230, to be sent during the given uplink radio block period. If an event-based PAN field 250 (or an event-based PDAN control message 258) is scheduled to be sent during the given uplink radio block period, the acknowledgment transmission unit 260 implements duplicate acknowledgment avoidance as follows. Although the following description focuses on processing an event-based PAN field 250 is described, the following description is also applicable to processing an event-based PDAN control message 258.

In an example implementation, if an event-based PAN field 250 is scheduled to be sent during the given uplink radio block period, the acknowledgment transmission unit 260 determines whether the DL event-based acknowledgment information to be reported via the event-based PAN field 250 (e.g., reporting one or more UNREPORTED missing DL data blocks) will remain unreported at the end of the given uplink radio block period if the event-based PAN field 250 is not sent. To make such a determination, the acknowledgment transmission unit 260 determines whether the DL event-based acknowledgment information (e.g., RB field) to be reported via the event-based PAN field 250 is also included in any DL polled acknowledgment information (e.g., RB field) to be reported via a polled response, such as any polled PAN 215 or PDAN control message 230, scheduled to be sent during the given uplink radio block period. If such a polled response is not scheduled to be sent during the given radio block period, the acknowledgment transmission unit 260 determines that the DL event-based acknowledgment information would remain unreported and, thus, causes the event-based PAN field 250 containing the DL event-based acknowledgment information to be sent during the given radio block period. However, if such a polled response is also scheduled to be sent during the given radio block period, the acknowledgment transmission unit 260 refrains from sending (e.g., blocks) the event-based PAN field 250 containing the DL event-based acknowledgment information and causes only the polled PAN 215 or PDAN control message 230 containing the DL polled acknowledgment information to be sent during the given radio block period. (In some examples, the acknowledgment transmission unit 260 also refrains from sending the event-based PAN field 250 if a polled response sending duplicate acknowledgment information is scheduled to be sent during a later radio block period.)

In at least some example implementations, the acknowledgment transmission unit 260 further evaluates one or more acknowledgment omission criteria to determine whether to refrain from sending an event-based PAN 250 containing event-based acknowledgment information that is duplicated in polled acknowledgment information to be sent by a polled PAN 215 or a PDAN control message 230. For example, such acknowledgment omission criteria can further characterize the likelihood of DL polled acknowledgment information duplicating DL event-based acknowledgment information not being received completely by the network by the end of the given uplink radio block period if only the polled PAN field 215 containing the DL polled acknowledgment information is sent. In such example implementations, although DL event-based acknowledgment information to be sent via an event-based PAN field 250 is also scheduled to be sent by a polled response (e.g., such as a polled PAN 215 or a PDAN control message 230) during the given uplink radio block period, the acknowledgment transmission unit 260 causes the event-based PAN field 250 to still be sent if the evaluated acknowledgment omission criteria indicate a substantial likelihood that all of the DL polled acknowledgment information (e.g., containing acknowledgment indications reporting one or more UNREPORTED missing DL data blocks) will not be received by the network. Conversely, the acknowledgment transmission unit 260 refrains from sending (e.g., blocks) the event-based PAN field 250 in the given UL radio block period if the evaluated acknowledgment omission criteria indicate a substantial likelihood that all of the DL polled acknowledgment information (in which the DL event-based acknowledgment information is duplicated) scheduled to be transmitted via the polled response is substantially likely to be received by the network.

Examples of the acknowledgment omission criteria to be evaluated by the acknowledgment transmission unit 260 include, but are not limited to: (1) a channel quality criterion indicating whether an estimated UL channel quality satisfies a threshold; (2) a polled response type criterion indicating whether the DL polled acknowledgment information is to be transmitted via a polled PAN 215 or a PDAN control message 230; (3) a remaining acknowledgment amount criterion indicating whether the amount of remaining acknowledgment information to be sent exceeds a threshold; (4) a downlink channel assignment criterion indicating whether the downlink channel assignment exceeds a threshold data rate or bandwidth; (5) a polled response scheduling criterion indicating whether the DL polled acknowledgment information including the DL event-based acknowledgment information is scheduled to be transmitted in the given radio block period or a later radio block period; etc. The acknowledgment transmission unit 260 may be configured to evaluate any one, any combination, or all of the preceding acknowledgment omission criteria.

For example, the channel quality criterion indicates that the DL polled acknowledgment information has a substantial likelihood of not being received by the network if the uplink channel quality does not meet (e.g., is less than) a specified threshold quality because the DL polled acknowledgment information may become corrupted during transmission, whereas the DL polled acknowledgment information has a substantial likelihood of being reported if the uplink channel quality meets (e.g., is greater than or equal to) the specified threshold quality. The uplink channel quality can be determined via any appropriate signal measurements, as well as inferred based on the modulation and coding scheme used to transmit the acknowledgment information.

The polled response type criterion can be used to further characterize the channel quality criterion under the scenario when the uplink channel quality does not meet (e.g., is less than) the specified threshold quality. Acknowledgment information provided by a PAN field (e.g., such as the polled PAN 215) is typically expected to be less reliable than the acknowledgment information provided by a packet ACK/NACK control message (e.g., such as the PDAN control message 230). The reduced reliability of the PAN field generally results from less error detection and correction, less robust encoding, or both, being employed for the PAN field than for a control message. Because of a resulting higher probability of false positive detections, PAN fields are generally treated with caution (e.g., by requiring confirmation via an appropriate packet ACK/NACK control message as described above) to avoid the possibility of any serious failure arising in case of such a false positive detection.

Due to the reduced reliability of PAN fields relative to control messages, and because PAN fields typically cannot send as much acknowledgment information as control messages, the polled response type criterion further indicates that the DL polled acknowledgment information has a substantial likelihood of not being received by the network when the DL polled acknowledgment information is to be reported by a polled PAN 215 and the uplink channel quality does not meet (e.g., is less than) the specified threshold quality. Conversely, the polled response type criterion indicates that the DL polled acknowledgment information has a substantial likelihood of being received by the network when this information is to be reported by a PDAN control message 230, even though the uplink channel quality does not meet (e.g., is less than) the specified threshold quality.

Taking the other acknowledgment omission criteria in turn, the remaining acknowledgment amount criterion indicates that the DL polled acknowledgment information duplicating the DL event-based acknowledgment information has a substantial likelihood of not being received completely by the network by the end of the given radio block period if the amount of unreported DL acknowledgment information exceeds a threshold. This is because all of the DL acknowledgment information (including the information that would have been reported by the event-based PAN 250) remaining to be reported may not be fully included in the polled PAN 215 or PDAN control message 230 sent during the given radio block period.

The downlink channel assignment criterion indicates that the DL polled acknowledgment information duplicating the DL event-based acknowledgment information has a substantial likelihood of not being received completely by the network by the end of the given radio block period if the downlink channel assignment exceeds a threshold data rate or bandwidth. This is because a large channel assignment may yield an amount of acknowledgment information that cannot be fully included in the DL polled acknowledgment information to be reported by the polled PAN 215 or PDAN control message 230 during the given radio block period.

The polled response scheduling criterion indicates that DL event-based acknowledgment information has a substantial likelihood of remaining unreported at the end of a first radio block period when this information is to be included (e.g., duplicated) in DL polled acknowledgment information to be reported in a later second radio block period. This is because the DL event-based acknowledgment information could be reported in the earlier first radio block period if the corresponding event-based PAN 250 was sent. This polled response scheduling criterion has applicability primarily in systems in which the acknowledgment transmission unit 260 can also refrain from sending the event-based PAN field 250 if a polled response sending duplicate acknowledgment information is scheduled to be sent during a later radio block period.

As noted above, the acknowledgment transmission unit 260 may be configured to evaluate any one, any combination or all of the preceding acknowledgment omission criteria. For example, the acknowledgment transmission unit 260 may be configured to cause an event-based PAN field 250 containing the DL event-based acknowledgment information to be sent during a given radio block period if one or more of the acknowledgment omission criteria indicate that there is a substantial likelihood that all of the DL polled acknowledgment information duplicating the DL event-based acknowledgment information will not be received completely by the network by the end of the given uplink radio block period. However, if the acknowledgment omission criteria evaluated by the acknowledgment transmission unit 260 indicate that there is a substantial likelihood that all of the DL polled acknowledgment information duplicating the DL event-based acknowledgment information will be received completely by the network, the acknowledgment transmission unit 260 refrains from sending (e.g., blocks) the event-based PAN field 250 to avoid transmission of duplicate acknowledgment information.

Additionally or alternatively, the acknowledgment transmission unit 260 may evaluate different acknowledgment criteria depending upon whether the DL event-based acknowledgment information is to be sent via an event-based PAN 250 or an event-based PDAN control 258. For example, as mentioned above, receiving DL acknowledgment information via an event-based PDAN control message 258 allows the network element 110 to advance its transmit window, whereas the network element 110 cannot advance its transmit window if the DL acknowledgment information is received via an event-based PAN 250 (due to the lower reliability of the event-based PAN 250). Accordingly, the acknowledgment transmission unit 260 may evaluate the polled response type criterion and then determine that the DL event-based acknowledgment information should be sent even if duplicate DL polled acknowledgment information is to be sent if the DL event-based acknowledgment information is to be sent via the event-based PDAN control message 258 and the DL polled acknowledgment information is to be reported via a polled PAN 215.

While an example manner of implementing the example mobile station 105 of FIG. 1 has been illustrated in FIG. 2, one or more of the elements, processes and/or devices illustrated in FIG. 2 may be combined, divided, re-arranged, omitted, eliminated and/or implemented in any other way. Further, the example RLC/MAC transmitter 115, the example RLC/MAC receiver 120, the example polling decoder 205, the example receive state array 235, the example polled acknowledgment processor 240, the example event-based acknowledgment processor 245, the example acknowledgment transmission unit 260 and/or, more generally, the example mobile station 105 of FIG. 2 may be implemented by hardware, software, firmware and/or any combination of hardware, software and/or firmware. Thus, for example, any of the example RLC/MAC transmitter 115, the example RLC/MAC receiver 120, the example polling decoder 205, the example receive state array 235, the example polled acknowledgment processor 240, the example event-based acknowledgment processor 245, the example acknowledgment transmission unit 260 and/or, more generally, the example mobile station 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example mobile station 105, the example RLC/MAC transmitter 115, the example RLC/MAC receiver 120, the example polling decoder 205, the example receive state array 235, the example polled acknowledgment processor 240, the example event-based acknowledgment processor 245 and/or the example acknowledgment transmission unit 260 are hereby expressly defined to include a tangible medium such as a memory, digital versatile disk (DVD), compact disk (CD), etc., storing such software and/or firmware. Further still, the example mobile station 105 of FIG. 2 may include one or more elements, processes and/or devices in addition to, or instead of, those illustrated in FIG. 2, and/or may include more than one of any or all of the illustrated elements, processes and devices.

Figure 3:
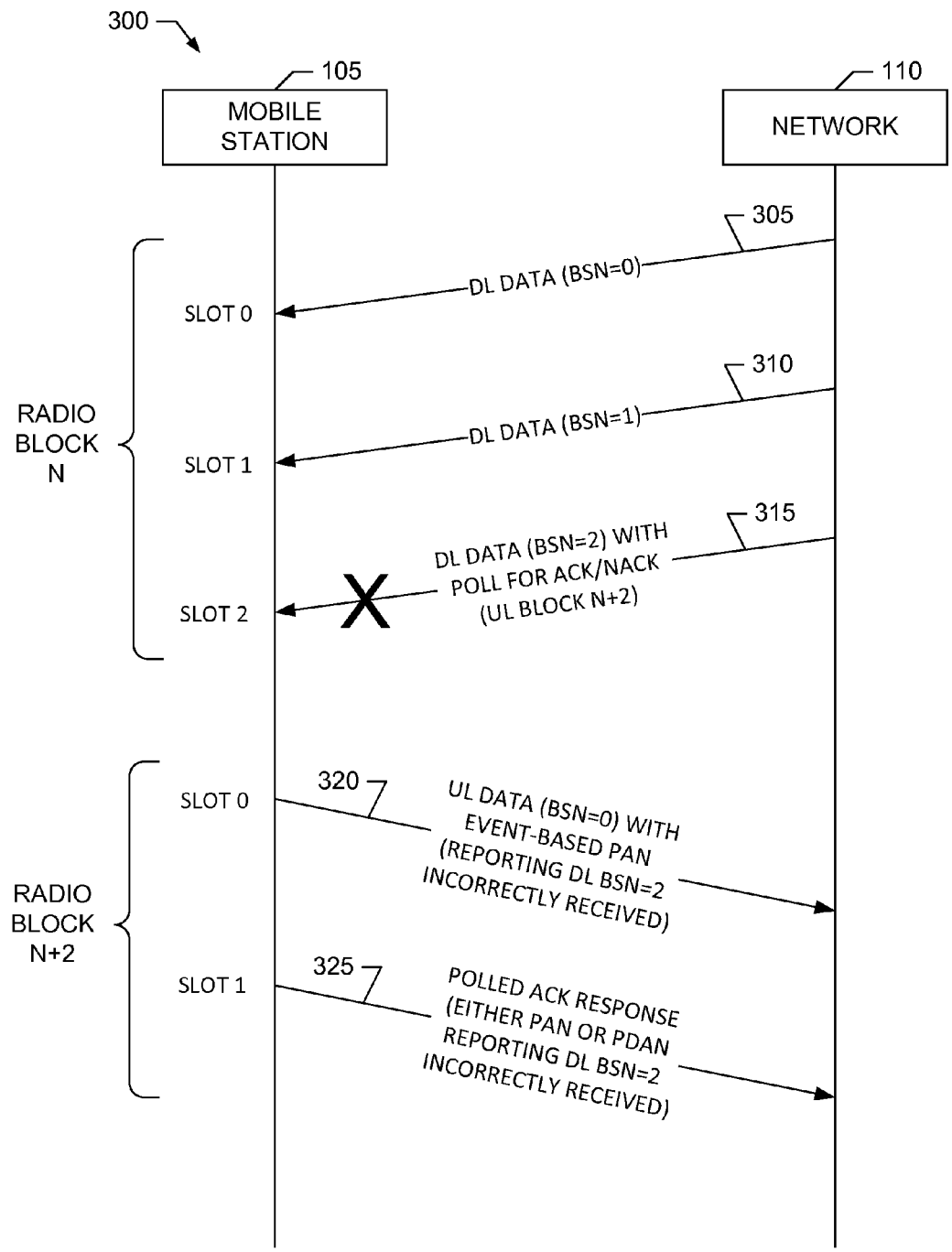
FIG. 3 depicts an example message sequence diagram illustrating conventional acknowledgment processing implemented by the example EGPRS communication system of FIG. 1.
Figure 4:
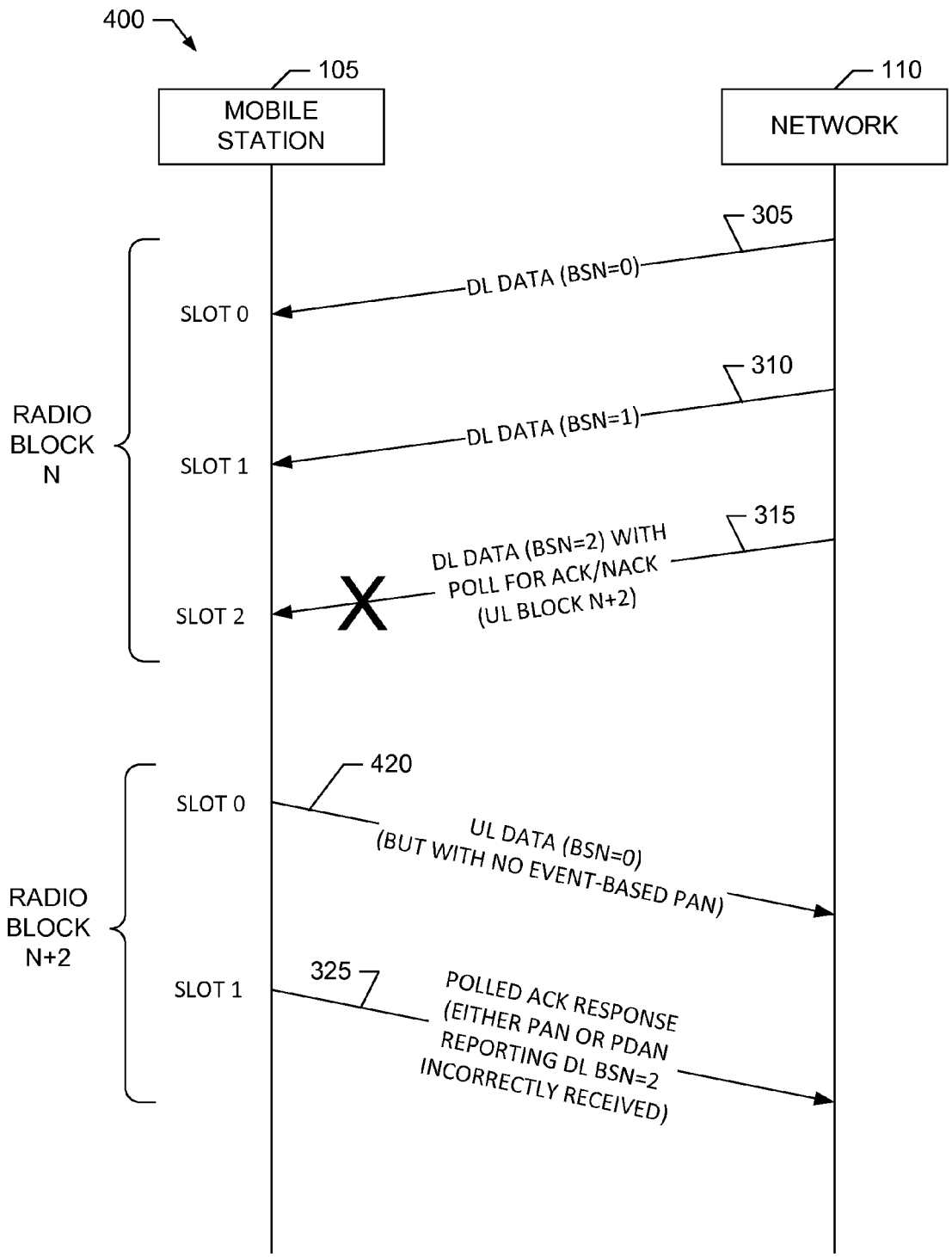
FIG. 4 depicts an example message sequence diagram illustrating a first example duplicate acknowledgment avoidance procedure implemented by the example EGPRS communication system of FIG. 1.
Figure 5:
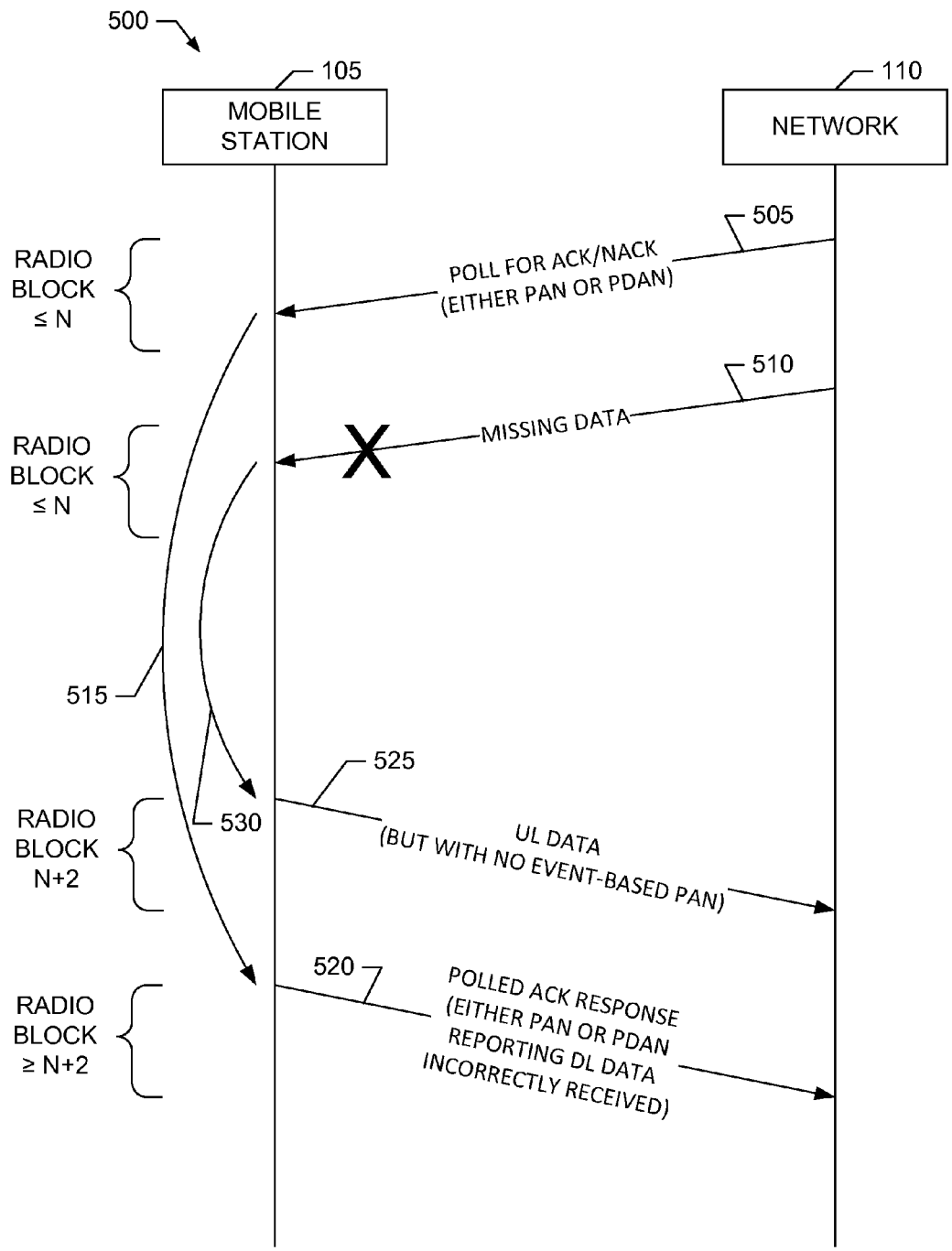
FIG. 5 depicts an example message sequence diagram illustrating a second example duplicate acknowledgment avoidance procedure implemented by the example EGPRS communication system of FIG. 1.

Example message sequence diagrams 300, 400 and 500 that further illustrate operation of the mobile station 105 of FIG. 1 or 2, or both, in the EGPRS communication system 100 are depicted in FIGS. 3, 4 and 5, respectively. For reference, the message sequence diagram 300 depicts example conventional acknowledgment processing that could be performed by the mobile station 105 instead of the duplicate acknowledgment avoidance techniques described herein. Message sequence diagrams 400 and 500 then depict example duplicate acknowledgment avoidance techniques implemented by the mobile station 105, thereby illustrating at least some of the benefits of these techniques over the conventional acknowledgment processing depicted in the message sequence diagram 300.

Turning to FIG. 3, and with reference to FIGS. 1 and 2, the message sequence diagram 300 begins with the mobile station 105 receiving a DL RLC/MAC data block 305 sent by the network element 110 during time slot 0 of the Nth radio block period. The DL RLC/MAC data block 305 has a BSN set to 0, and this data block is decoded correctly by the mobile station 105. Accordingly, the element of the receive state array 235 associated with the received DL RLC/MAC data block 305 is set to RECEIVED.

Next, the mobile station 105 receives a DL RLC/MAC data block 310 sent by the network element 110 during time slot 1 of the Nth radio block period. The DL RLC/MAC data block 310 has a BSN set to 1, and this data block is decoded correctly by the mobile station 105. Accordingly, the element of the receive state array 235 associated with the received DL RLC/MAC data block 310 is set to RECEIVED.

Next, the mobile station 105 receives a DL RLC/MAC data block 315 sent by the network element 110 during time slot 2 of the Nth radio block period. In the illustrated example, the header of the DL RLC/MAC data block 315 is decoded correctly by the mobile station 105 and includes a CES/P field sending an acknowledgment poll to the mobile station 105. The acknowledgment poll included with the DL RLC/MAC data block 315 can correspond to a poll-for-PAN message 210 or a poll-for-PDAN message 225. The poll included with the DL RLC/MAC data block 315 also indicates that the response to the poll (e.g., such as a polled PAN 215 or a PDAN control message 230) is to be sent in radio block period N+2 (e.g., two radio block periods after the poll is received).

In the illustrated example, the mobile station 105 also incorrectly decodes the RLC data portion of the DL RLC/MAC data block 315 (which is represented by a large "X" through the directed line labeled 315), although the mobile station 105 does correctly decode the header, which indicates the BSN is set to 2. The mobile station 105 treats the incorrectly decoded DL RLC/MAC data block 315 as missing. Accordingly, the element of the receive state array 235 associated with the missing DL RLC/MAC data block 315 is set to UNREPORTED, because the acknowledgment status (e.g., NACK) of this block has not yet been reported to the network element 110.

The event-based FANR procedure implemented by the mobile station 105 causes an event-based PAN (e.g., such as the event-based PAN 250) to be generated proactively (e.g., automatically) for inclusion with an UL RLC/MAC data block 320 to be transmitted to the network element 110 during time slot 0 of radio block period N+2 (i.e., which is two radio block periods after determining that the incorrectly decoded DL RLC/MAC data block 315 having BSN=2 is a missing block). For example, because the element of the receive state array 235 associated with the missing DL RLC/MAC data block 315 is set to UNREPORTED, the event-based FANR procedure implemented by the mobile station 105 automatically generates an event-based PAN having an RB field to report, among other acknowledgment indications, a NACK for the DL RLC/MAC data block 315. In the context of the message sequence diagram 300, the mobile station 105 implements conventional acknowledgment processing that does not avoid sending duplicate acknowledgments according to the techniques described herein. Therefore, the mobile station 105 automatically sends the generated event-based PAN with the UL RLC/MAC data block 320 without checking whether the acknowledgment information included in the event-based PAN will also be reported in response to the poll included with the DL RLC/MAC data block 315.

Then, during time slot 1 of radio block period N+2, the mobile station 105 also sends a polled acknowledgment response 325 to the network element 110. The polled acknowledgment response 325 can be, for example, a polled PAN 215 sent in response to a poll-for-PAN message 210 included with the DL RLC/MAC data block 315, or a PDAN control message 230 sent in response to a poll-for-PDAN message 225 included with the DL RLC/MAC data block 315. Because the polled acknowledgment response 325 is sent in the same radio block period as the UL RLC/MAC data block 320 including the event-based PAN, the network element 110 will not have had time to respond to the NACK indication provided in the event-based PAN for the missing DL RLC/MAC data block 315. Thus, the polled acknowledgment information included in the polled acknowledgment response 325 will also include a NACK for the DL RLC/MAC data block 315, duplicating the event-based acknowledgment information provided by the event-based PAN included with the UL RLC/MAC data block 320. The message sequence diagram 300 then ends.

In an implementation conforming to 3GPP Release 7 EGPRS, an event-based PAN, such as the event-based PAN 250, has a size of 25 bits. In the example message sequence diagram 300, sending the duplicate event-based acknowledgment information in the event-based PAN included with the UL RLC/MAC data block 320 wastes transmission of bits that could be better allocated to sending more UL RLC/MAC data or existing RLC/MAC data more robustly (e.g., with more coding gain).

The message sequence diagram 400 of FIG. 4 illustrates a first example duplicate acknowledgment avoidance technique implemented by the mobile station 105. Operation of the message sequence diagram 400 from receiving the DL RLC/MAC data block 305 to receiving the DL RLC/MAC data block 315 is substantially the same as for the message sequence diagram 300 of FIG. 3, which is described in detail above. In the interest of brevity, the details of the operation of the message sequence diagram 400 from receiving the DL RLC/MAC data block 305 to receiving the DL RLC/MAC data block 315 are not duplicated here.

Turning to FIG. 4, and as described above in connection with the message sequence diagram 300, after receiving the DL RLC/MAC data block 315, the mobile station 105 illustrated in the message sequence diagram 400 has classified the DL RLC/MAC data block 315 as missing (e.g., by setting its associated element in the receive state array 235 to UNREPORTED). The mobile station 105 has also been instructed by the network element 110 to provide DL polled acknowledgment information in radio block N+2. However, unlike the message sequence diagram 300 of FIG. 3, the mobile station 105 in the message sequence diagram 400 does not generate an event-based PAN for inclusion with an UL RLC/MAC data block 420 to be sent to the network element during time slot 0 of the radio block period N+2 because the mobile station 105 in this example implements duplicate acknowledgment avoidance.

In particular, prior to the start of radio block N+2, the mobile station 105 determines that any DL event-based acknowledgment information (e.g., reporting a NACK for the DL RLC/MAC data block 315) that would have been reported via an event-based PAN included with the UL RLC/MAC data block 420 is also to be reported via the DL polled acknowledgment information conveyed by the polled acknowledgment response 325. Thus, the mobile station 105 prevents its event-based FANR procedure from generating or at least sending an event-based PAN with the UL RLC/MAC data block 420. In a 3GPP EGPRS Release 7 implementation, such duplicate acknowledgment avoidance saves 25 bits in the UL RLC/MAC data block 420 that can be allocated to sending more UL RLC/MAC data or existing RLC/MAC data more robustly (e.g., with more coding gain).

The message sequence diagram 500 of FIG. 5 illustrates a second example duplicate acknowledgment avoidance technique implemented by the mobile station 105. With reference to FIGS. 1 and 2, the message sequence diagram 500 begins with the mobile station 105 receiving an acknowledgment poll 505 from the network element 110 requesting DL acknowledgment status. The acknowledgment poll 505 is received by the mobile station 105 during or before the Nth radio block period, and indicates that the mobile station 105 is to respond to the poll in radio block period N+2 or some later radio block period. The acknowledgment poll 505 can correspond to a poll-for-PAN message 210 or a poll-for-PDAN message 225 implemented by, for example, one or more CES/P fields included with DL RLC/MAC data blocks sent by the network element 110 to the mobile station 105.

During or before the Nth radio block period, the mobile station 105 also detects a missing DL RLC/MAC data block (represented by the directed line labeled 510 in FIG. 5). Accordingly, the element of the receive state array 235 associated with the missing data block 510 is set to UNREPORTED, because the acknowledgment status (e.g., NACK) of this block has not yet been reported to the network element 110. Although the missing data block 510 is depicted as being detected after receipt of the acknowledgment poll 505 in FIG. 5, the relative ordering of these events can be reversed provided the acknowledgment poll 505 is received by the mobile station 105 before it sends an event-based PAN in response detecting the missing block 510.

Next, the mobile station 105 processes the acknowledgment poll 505 (with such processing represented by the directed line labeled 515) to prepare appropriate DL polled acknowledgment information to be returned to the network element 110 via a polled acknowledgment response 520. The polled acknowledgment response 520 is sent by the mobile station 105 to the network element 110 in the appropriate radio block period ≥N+2 indicated in the acknowledgment poll 505. As described above, the polled acknowledgment response 520 can be, for example, a polled PAN 215 sent in response to the acknowledgment poll 505 corresponding to a poll-for-PAN message, or a PDAN control message 230 sent in response to the acknowledgment poll 505 corresponding to a poll-for-PDAN message 225. In the illustrated example, the DL polled acknowledgment information conveyed by the polled acknowledgment response 520 includes the acknowledgment status (e.g., NACK) of the missing data block 510 because the element of the receive state array 235 associated with the missing data block 510 is set to UNREPORTED.

Additionally, in preparation for sending an UL RLC/MAC data block 525 during radio block period N+2, the mobile station 105 performs event-based FANR and duplicate acknowledgment avoidance processing (with such processing represented by the directed line labeled 530). Because the element of the receive state array 235 associated with the missing data block 510 is set to UNREPORTED, the event-based FANR procedure would typically generate an event-based PAN proactively (e.g., automatically) for inclusion with the UL RLC/MAC data block 525. However, using the techniques described herein, the duplicate acknowledgment avoidance procedure implemented by the mobile station 105 determines that the acknowledgment status (e.g., NACK) of the missing data block 510 is also to be reported (or has a substantial likelihood of being reported) by the polled acknowledgment response 520. As such, the mobile station 105 prevents its event-based FANR procedure from generating or at least sending an event-based PAN with the UL RLC/MAC data block 525, thereby improving bandwidth utilization and spectral efficiency (e.g., by saving 25 data bits in a 3GPP EGPRS Release 7 implementation).

Figure 6A:
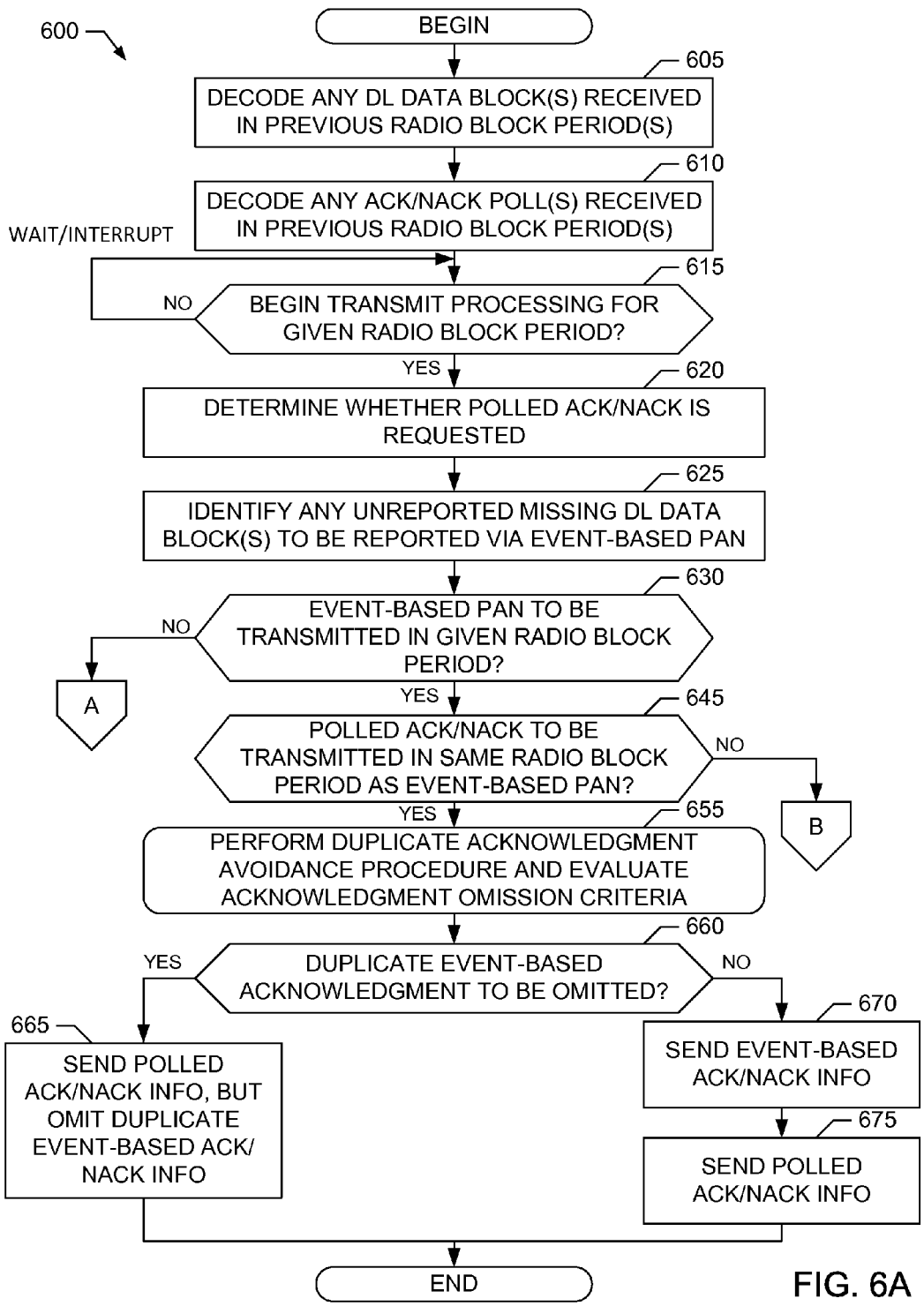
FIGS. 6A-B collectively illustrate a flowchart representative of an example process that may be performed to implement duplicate acknowledgment avoidance in the example mobile station of FIG. 2.
Figure 6B:
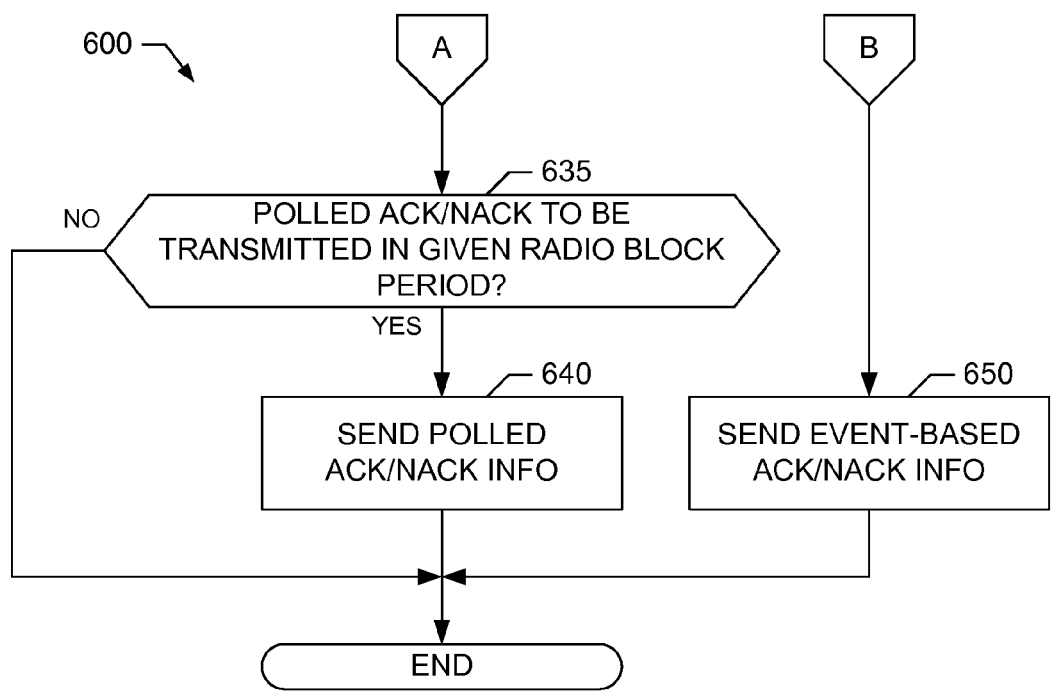
Figure 7:
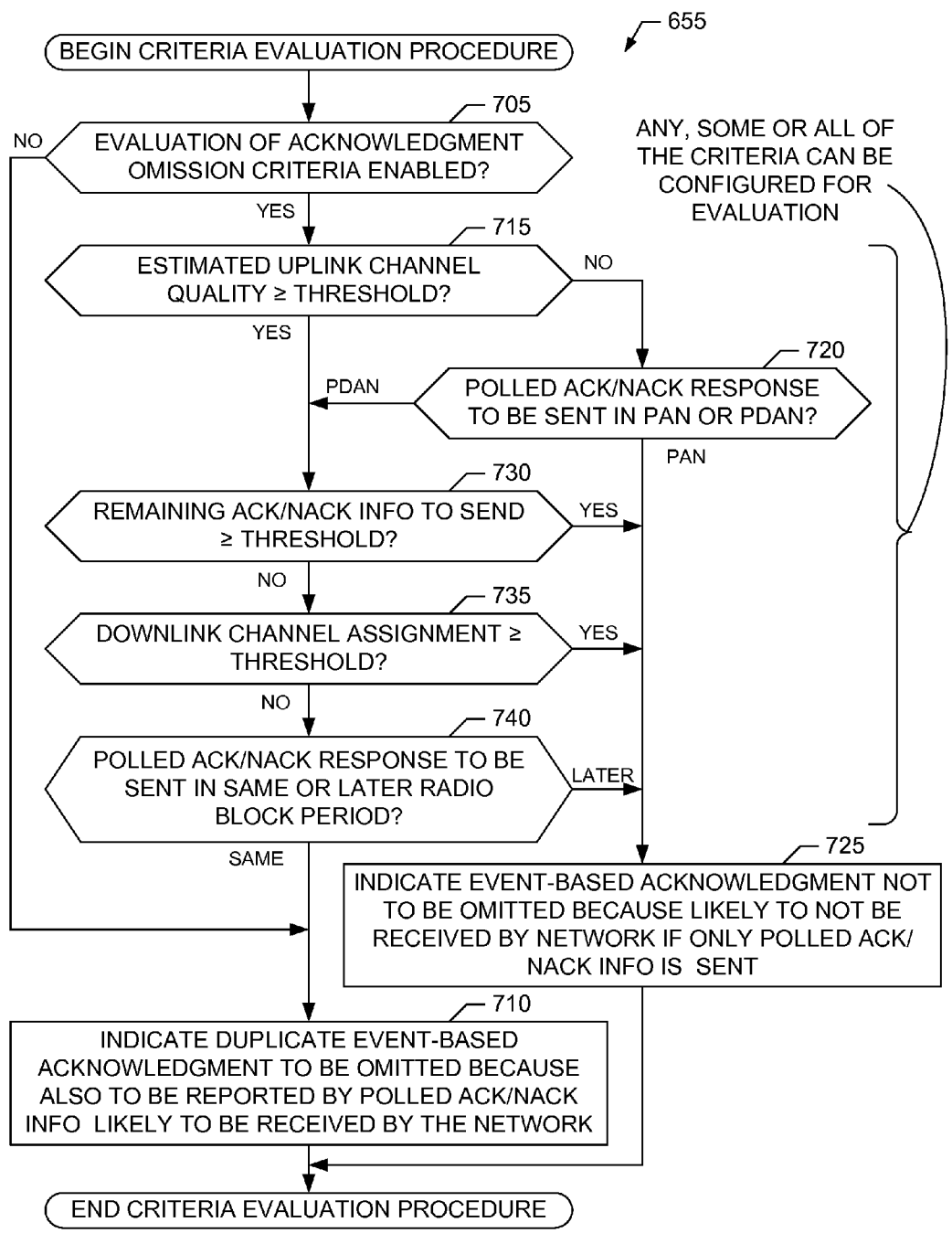
FIG. 7 is a flowchart representative of an example process for evaluating acknowledgment omission criteria that may be used to implement the example process of FIGS. 6A-B or the example mobile station of FIG. 2, or both.

Flowcharts representative of example processes that may be executed to implement any, some or all of the example EGPRS communication system 100, the example mobile station 105, the example RLC/MAC transmitter 115, the example RLC/MAC receiver 120, the example polling decoder 205, the example receive state array 235, the example polled acknowledgment processor 240, the example event-based acknowledgment processor 245 and the example acknowledgment transmission unit 260 are shown in FIGS. 6A-B and 7.

In these examples, the process represented by each flowchart may be implemented by one or more programs comprising machine readable instructions for execution by: (a) a processor, such as the processor 812 shown in the example processing system 800 discussed below in connection with FIG. 8, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 812, but the entire program or programs and/or portions thereof could alternatively be executed by a device other than the processor 812 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example EGPRS communication system 100, the example mobile station 105, the example RLC/MAC transmitter 115, the example RLC/MAC receiver 120, the example polling decoder 205, the example receive state array 235, the example polled acknowledgment processor 240, the example event-based acknowledgment processor 245 could be implemented by any combination of software, hardware, and/or firmware. Also, some or all of the processes represented by the flowcharts of FIGS. 6A-B and 7 may be implemented manually.

Further, although the example processes are described with reference to the flowcharts illustrated in FIGS. 6A-B and 7, many other techniques for implementing the example methods and apparatus described herein may alternatively be used. For example, with reference to the flowcharts illustrated in FIGS. 6A-B and 7, the order of execution of the blocks may be changed, and/or some of the blocks described may be changed, eliminated, combined and/or subdivided into multiple blocks.

An example process 600 that may be executed to implement duplicate acknowledgment avoidance in the example mobile unit 105 of FIG. 1 or 2, or both, is illustrated in FIGS. 6A-B. The process 600 may be executed at predetermined intervals (e.g., such as prior to a next UL radio block period), based on an occurrence of a predetermined event (e.g., such as detection of a missing DL data block), as a background process, etc., or any combination thereof. With reference to FIGS. 1 and 2, the process 600 of FIGS. 6A-B begins execution at block 605 of FIG. 6A at which the RLC/MAC receiver 120 in the mobile station 105 decodes any DL RLC/MAC data blocks 175 received from the network element 110 during one or more radio block period(s) prior to a given radio block period in which the mobile station 105 is to transmit data. Then, at block 610 the polling decoder 205 in the mobile station 105 decodes any acknowledgment polls received from the network element 110 during one or more radio block period(s) prior to a given radio block period in which the mobile station 105 is to transmit data. For example, at block 610 the polling decoder 205 can decode a poll-for-PAN message 210 or a poll-for-PDAN message 225 requesting polled DL acknowledgment information from the mobile station 105.

Then, control proceeds to block 615 at which the RLC/MAC transmitter 115 in the mobile station 105 determines whether transmit processing for a given radio block period is to begin. For example, at block 615 the RLC/MAC transmitter 115 can use any combination of polling or interrupt-driven processing to determine when to begin transmit processing for the given radio block period. When transmit processing is to begin, control proceeds to block 620 at which the polled acknowledgment processor 240 in the mobile station 105 determines whether any polling messages requesting DL polled acknowledgment information to be sent during the given radio block period were decoded at block 610.

Control then proceeds to block 625 at which the event-based acknowledgment processor 245 in the mobile station 105 identifies any DL RLC/MAC data blocks identified as missing during the decoding performed at block 605 and that have not yet been reported to the network element 110. For example, at block 625 the event-based acknowledgment processor 245 implements event-based FANR and processes the receive state array 235 used to track the status of DL RLC/MAC data blocks. As described above, a missing DL RLC/MAC data block is associated with an element in the receive state array 235 that is set to the UNREPORTED state when the data block is initially detected as missing and has not yet been reported to the network element 110. Thus, at block 625 the event-based acknowledgment processor 245 determines whether the receive state array 235 has any elements set to the UNREPORTED state.

Next, control proceeds to block 630 at which the event-based acknowledgment processor 245 determines whether an event-based PAN 250 is to be transmitted during the given radio block period. For example, at block 630 the event-based acknowledgment processor 245 implements event-based FANR and determines whether the processing at block 625 identified any missing DL data blocks whose elements in the receive state array 235 are set to the UNREPORTED state. If no such UNREPORTED missing DL data blocks were identified at block 625, the event-based acknowledgment processor 245 determines that no event-based PAN 250 is to be transmitted during the given radio block period (block 630), and control proceeds to block 635 of FIG. 6B.

At block 635 of FIG. 6B, the polled acknowledgment processor 240 determines whether the processing at block 620 determined that DL polled acknowledgment information was requested by a poll from the network element 110 and is to be sent during the given radio block period. If DL polled acknowledgment information is to be sent during the given radio block period (block 635), control proceeds to block 640 at which the acknowledgment transmission unit 260 in the acknowledgment transmission unit 260 determines that only polled acknowledgment information is to be sent and, therefore, no duplicate acknowledgment avoidance is required. As such, the acknowledgment transmission unit 260 causes the DL polled acknowledgment information to be sent using, for example, a polled PAN field 215 if the corresponding acknowledgment poll decoded at block 610 was a poll-for-PAN message 210, or a PDAN control message 230 if the corresponding acknowledgment poll decoded at block 610 was a poll-for-PDAN message 225 or the mobile station has no uplink data to transmit. After the DL polled acknowledgment information is caused to be sent at block 640, or if no DL polled acknowledgment information is to be sent (block 635), execution of the example process 600 then ends.

Returning to block 630 of FIG. 6A, if one or more UNREPORTED missing DL data blocks were identified at block 625, the event-based acknowledgment processor 245 determines that an event-based PAN 250 is to be transmitted during the given radio block period (block 630), and control proceeds to block 645. At block 645 the polled acknowledgment processor 240 determines whether the processing at block 620 determined that DL polled acknowledgment information was requested by a poll from the network element 110 and is also to be sent during the given radio block period. If DL polled acknowledgment information is not to be sent during the given radio block period (block 645), control proceeds to block 650 of FIG. 6B.

At block 650 of FIG. 6B, the acknowledgment transmission unit 260 determines that only event-based acknowledgment information is to be sent and, therefore, no duplicate acknowledgment avoidance is required. As such, the acknowledgment transmission unit 260 causes the DL event-based acknowledgment information to be sent using, for example, an event-based PAN field 250. After processing at block 650 completes, execution of the example process 600 ends.

Returning to block 645 of FIG. 6A, if DL polled acknowledgment information is to be sent during the given radio block period, control proceeds to block 655 at which the acknowledgment transmission unit 260 implements a duplicate acknowledgment avoidance procedure and evaluates any associated acknowledgment omission criteria because duplicate event-based and polled acknowledgments are scheduled to be sent in the given radio block period being processed. In the illustrated example, the acknowledgment transmission unit 260 is able to refrain from sending the duplicate DL event-based acknowledgment information so long as the DL polled acknowledgment information is to be sent in the same radio block period regardless of whether the event-based and polled acknowledgment information are scheduled to be sent in different time slots of the radio block period. In other words, although the DL polled acknowledgment information may be scheduled to be sent during a different time slot of the given radio block period than the time slot during which the DL polled acknowledgment information is to be sent, control can proceed to block 655 so long as both the event-based and polled acknowledgment information are scheduled to be sent in the same radio block period. In general, the duplicate acknowledgment avoidance procedure implemented at block 655 refrains from sending (e.g., blocks) an event-based PAN 250 carrying event-based acknowledgment information if such acknowledgment information is to also be timely reported by a polled PAN 215 or PDAN control message 230 carrying polled acknowledgment information. An example procedure for implementing the processing at block 655 is illustrated in FIG. 7 and described in greater detail below.

After the duplicate acknowledgment avoidance procedure of block 655 completes, control proceeds to block 660 at which the acknowledgment transmission unit 260 determines whether the event-based acknowledgment information scheduled to be transmitted is duplicated by the polled acknowledgment information to be reported and, thus, can be omitted. If the event-based acknowledgment information scheduled to be transmitted can be omitted (block 660), control proceeds to block 665 at which the acknowledgment transmission unit 260 causes only the DL polled acknowledgment information to be sent using, for example, polled PAN field 215 if the corresponding acknowledgment poll decoded at block 610 was a poll-for-PAN message 210, or a PDAN control message 230 if the corresponding acknowledgment poll decoded at block 610 was a poll-for-PDAN message 225. After the DL polled acknowledgment information is caused to be sent at block 665, execution of the example process 600 ends.

However, if the event-based acknowledgment information scheduled to be transmitted cannot be omitted because it is not duplicative or there is a substantial likelihood it would remain unreported if not sent (block 660), control proceeds to block 670 at which the acknowledgment transmission unit 260 causes the DL event-based acknowledgment information to be sent using, for example, an event-based PAN field 250. Control then proceeds to block 675 at which the acknowledgment transmission unit 260 causes the DL polled acknowledgment information to be sent using, for example, polled PAN field 215 if the corresponding acknowledgment poll decoded at block 610 was a poll-for-PAN message 210, or a PDAN control message 230 if the corresponding acknowledgment poll decoded at block 610 was a poll-for-PDAN message 225. After the DL acknowledgment information is caused to be sent at blocks 670 and 675, execution of the example process 600 ends.

An example procedure 655 to implement the duplicate acknowledgment avoidance processing and associated acknowledgment omission criteria evaluation at block 655 of FIG. 6A is illustrated in FIG. 7. With reference to FIGS. 1 and 2, the example procedure 655 of FIG. 7 begins under a condition that an event-based PAN 250 carrying DL event-based acknowledgment information is scheduled to be transmitted during a given radio block period being processed, and either a polled PAN 215 or a PDAN control message 230 carrying DL polled acknowledgment information is also scheduled to be transmitted during the given period. With that in mind, the procedure 655 of FIG. 7 begins execution at block 705 at which the acknowledgment transmission unit 260 in the mobile station 105 determines whether evaluation of any acknowledgment omission criteria is enabled. If acknowledgment omission criteria evaluation is not enabled (block 705), control proceeds to block 710 at which the acknowledgment transmission unit 260 defaults to indicating that the DL event-based acknowledgment information to be carried by the event-based PAN 250 can be omitted because it is duplicative of DL polled acknowledgment information to be carried by either the polled PAN 215 or the PDAN control message 230, and all of the DL polled acknowledgment information is substantially likely to be received by the network element 110. Execution of the example procedure 655 then ends.

However, if acknowledgment omission criteria evaluation is enabled (block 705), control proceeds to block 715 at which the acknowledgment transmission unit 260 evaluates a channel quality criterion indicating whether an estimated UL channel quality satisfies a threshold. If the estimated UL channel quality does not satisfy (e.g., is not greater than or equal to) the specified threshold (block 715), control proceeds to block 720 at which the acknowledgment transmission unit 260 evaluates a polled response type criterion indicating whether the DL polled acknowledgment information is to be transmitted via a polled PAN 215 or a PDAN control message 230. If the DL polled acknowledgment information is to be transmitted via the polled PAN 215 (block 720), control proceeds to block 725 at which the acknowledgment transmission unit 260 indicates that the DL event-based acknowledgment information to be carried by the event-based PAN 250 cannot be omitted because there is a substantial likelihood it will not be received by the network element 110 if the event-based PAN 250 is not sent and only the DL polled acknowledgment information is sent by either the polled PAN 215 or the PDAN control message 230. Execution of the example procedure 655 then ends.

If, however, the DL polled acknowledgment information is to be transmitted via the PDAN control message 230 (block 720), or if the estimated UL channel quality does satisfy (e.g., is greater than or equal to) the specified threshold (block 715), control proceeds to block 730 at which the acknowledgment transmission unit 260 evaluates a remaining acknowledgment amount criterion indicating whether the amount of remaining acknowledgment information to be sent exceeds a threshold. If the remaining acknowledgment information to be sent (characterized, for example, by the difference between the highest BSN of all blocks received successfully and the lowest BSN of all blocks not yet received successfully) exceeds the specified threshold (block 730), control proceeds to block 725 whose operation is described above. However, if the remaining acknowledgment information to be sent does not exceed the specified threshold (block 730), control proceeds to block 735.

At block 735, the acknowledgment transmission unit 260 evaluates a downlink channel assignment criterion indicating whether the downlink channel assignment exceeds a threshold data rate or bandwidth. If the downlink channel assignment exceeds the specified threshold (block 735), control proceeds to block 725 whose operation is described above. However, if the downlink channel assignment does not exceed the specified threshold (block 735), control proceeds to block 740.

At block 740, the acknowledgment transmission unit 260 evaluates a polled response scheduling criterion indicating whether the DL polled acknowledgment information is scheduled to be transmitted in the given radio block period during which the DL event-based acknowledgment information is scheduled to be transmitted, or a later radio block period. The polled response scheduling criterion has applicability primarily in systems in which the acknowledgment transmission unit 260 can also refrains from sending the DL event-based acknowledgment information if a polled response sending duplicate acknowledgment information is scheduled to be sent during a radio block period later than the given radio block period. If the DL polled acknowledgment information is scheduled to be transmitted during a later radio block period (block 740), control proceeds to block 725 whose operation is described above. However, if the DL polled acknowledgment information is scheduled to be transmitted during the same radio block period as the DL event-based acknowledgment information (block 740), control proceeds to block 710 whose operation is described above.

As shown in FIG. 7, in an example implementation, any, some or all of the criterion represented by blocks 715, 720, 730, 735 and 740 may be evaluated to determine whether the DL event-based acknowledgment information to be carried by the event-based PAN 250 can be omitted because it is duplicative and has a substantial likelihood of being reported by the DL polled acknowledgment information to be carried by either the polled PAN 215 or the PDAN control message 230.

As yet another example, the duplicate acknowledgment avoidance techniques described herein can be implemented in a communication system conforming to 3GPP EGPRS Release system by appropriately modifying 3GPP Technical Specification (TS) 44.060, V7.17.0 (May 2009), which is hereby incorporated by reference in its entirety. An example modification to 3GPP TS 44.060 to support the duplicate acknowledgment avoidance techniques described herein is to replace the existing second paragraph of section 9.1.14.3 with the following text:

"If the RLC endpoint receiver is the mobile station, event-based FANR is enabled for this temporary block flow (TBF) and the mobile station has at least one assigned TBF in the uplink direction, the mobile station shall insert one PAN field in an EGPRS RLC/MAC block for data transfer transmitted during a given radio block period for that uplink TBF if the state of any element in the receive state array V(N) is UNREPORTED and would otherwise remain UNREPORTED if no event-based PAN was transmitted, taking into account any ACK/NACK information transmitted during the radio block period in response to a poll (either for a PAN, for an EGPRS PACKET DOWNLINK ACK/NACK message, or for an EGPRS PACKET DOWNLINK ACK/NACK TYPE 2 message). The mobile station may continue to insert PAN fields in subsequent EGPRS RLC/MAC data blocks sent in the same radio block period as long as there exists one or more elements in the receive state array V(N) whose state is UNREPORTED."

Figure 8:
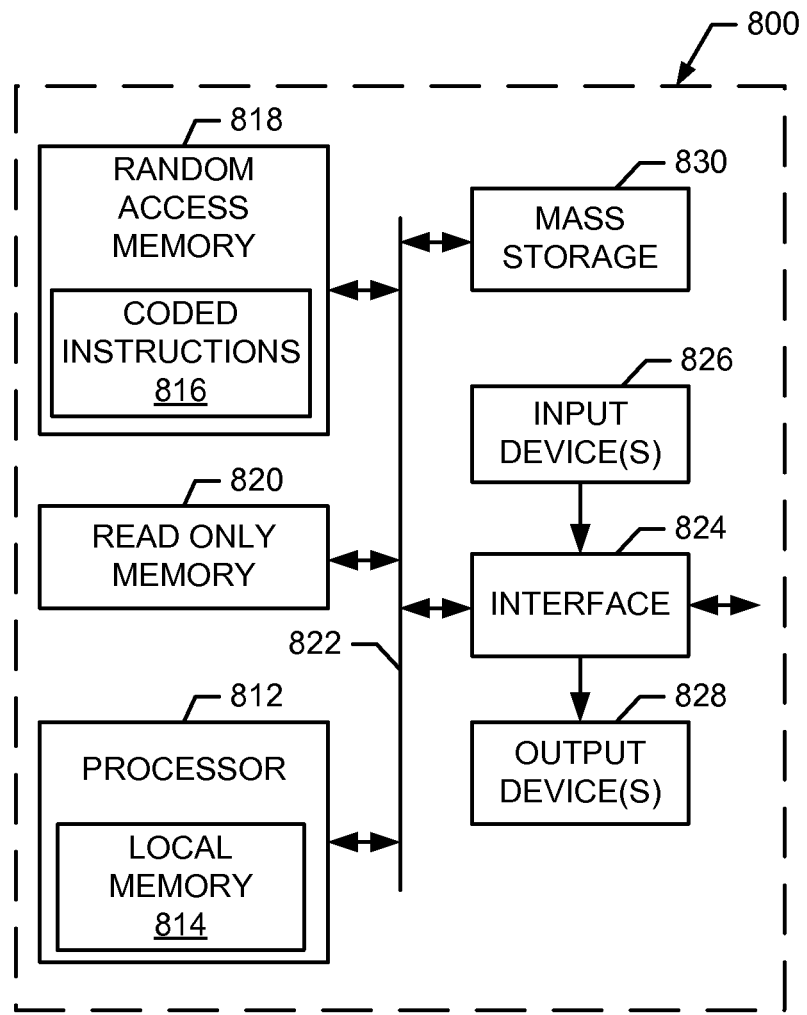
FIG. 8 is a block diagram of an example processing system that may store and execute example machine readable instructions used to implement some or all of the processes of FIG. 6A-B or 7, or both, to implement the example mobile station of FIG. 2, the example EGPRS communication system of FIG. 1, or both.

FIG. 8 is a block diagram of an example processing system 800 capable of implementing the apparatus and methods disclosed herein. The processing system 800 can correspond to, for example, a mobile station processing platform, a network element processing platform, a server, a personal computer, a personal digital assistant (PDA), an Internet appliance, a mobile phone, or any other type of computing device.

The system 800 of the instant example includes a processor 812 such as a general purpose programmable processor, an embedded processor, a microcontroller, etc. The processor 812 includes a local memory 814, and executes coded instructions 816 present in the local memory 814 and/or in another memory device. The processor 812 may execute, among other things, machine readable instructions to implement the processes represented in FIG. 6A-B or 7, or both. The processor 812 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PICO family of microcontrollers, etc. Of course, other processors from other families are also appropriate.

The processor 812 is in communication with a main memory including a volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The computer 800 also includes an interface circuit 824. The interface circuit 824 may be implemented by any type of interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The computer 800 also includes one or more mass storage devices 830 for storing software and data. Examples of such mass storage devices 830 include floppy disk drives, hard drive disks, compact disk drives and digital versatile disk (DVD) drives. The mass storage device 830 may store the receive state array V(N) 235. Alternatively, the volatile memory 818 may store the receive state array V(N) 235.

As an alternative to implementing the methods and/or apparatus described herein in a system such as the device of FIG. 8, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for a mobile station configured to send acknowledgment information, the method comprising:
   determining that an acknowledgment status of a first downlink data block classified as unreported is to be reported to a network by an event-based acknowledgement information in a radio block period;
   determining that the acknowledgment status of the first downlink data block is to be reported by a polled acknowledgment response to be sent in response to a poll received from the network in the radio block period; and
   in response to determining that the acknowledgment status of the first downlink data block is to be reported by both the polled acknowledgment response and the event-based acknowledgement information in the radio block period:

sending the polled acknowledgment response to report the acknowledgment status of the first downlink data block; and refraining from sending the event-based acknowledgment information.

2. The method as defined in claim 1, wherein the event-based acknowledgment information comprises at least one of: (1) a piggybacked ACK/NACK (PAN) field to be sent by the mobile station according to an enhanced general packet radio service (EGPRS) event-based fast ACK/NACK reporting (FANR) procedure, or (2) an ACK/NACK field to be sent by the mobile station in an EGPRS ACK/NACK control message.

3. The method as defined in claim 1, wherein the polled acknowledgment information comprises at least one of: (1) a PAN field to be sent by the mobile station according to an EGPRS polled FANR procedure, or (2) an ACK/NACK field to be sent by the mobile station in an EGPRS ACK/NACK control message.

4. The method as defined in claim 1, wherein classifying the first downlink data block as unreported comprises setting an element of a receive state array to an unreported state, the element corresponding to the first downlink data block.

5. The method as defined in claim 1, wherein the acknowledgment status of the first downlink data block corresponds to a NACK.

6. The method as defined in claim 1, wherein the first downlink data block is received before the poll.

7. The method as defined in claim 1, wherein the first downlink data block is received after the poll.

8. A machine readable storage device or storage disk comprising machine readable instructions which, when executed, cause a machine to at least:

determine that an acknowledgment status of a first downlink data block classified as unreported is to be reported to a network by an event-based acknowledgement information in a radio block period;

determine that the acknowledgment status of the first downlink data block is to be reported by a polled acknowledgment response to be sent in response to a poll received from the network in the radio block period; and in response to determining that the acknowledgment status of the first downlink data block is to be reported by both the polled acknowledgment response and the event-based acknowledgement information in the radio block period:

send the polled acknowledgment response to report the acknowledgment status of the first downlink data block; and refrain from sending the event-based acknowledgment information.

9. The storage device or storage disk as defined in claim 8, wherein the event-based acknowledgment information comprises at least one of: (1) a piggy-backed ACK/NACK (PAN) field to be sent by the mobile station according to an enhanced general packet radio service (EGPRS) event-based fast ACK/NACK reporting (FANR) procedure, or (2) an ACK/NACK field to be sent by the mobile station in an EGPRS ACK/NACK control message.

10. The storage device or storage disk as defined in claim 8, wherein the polled acknowledgment information comprises at least one of: (1) a PAN field to be sent by the mobile station according to an EGPRS polled FANR procedure, or (2) an ACK/NACK field to be sent by the mobile station in an EGPRS ACK/NACK control message.

11. The storage device or storage disk as defined in claim 8, wherein to classify the first downlink data block as unreported, the instructions, when executed, cause the machine to set an element of a receive state array to an unreported state, the element corresponding to the first downlink data block.

12. The storage device or storage disk as defined in claim 8, wherein the acknowledgment status of the first downlink data block corresponds to a NACK.

13. The storage device or storage disk as defined in claim 8, wherein the first downlink data block is to be received before the poll.

14. The storage device or storage disk as defined in claim 8, wherein the first downlink data block is to be received after the poll.

15. A mobile station comprising:

a processor to:

determine that an acknowledgment status of a first downlink data block classified as unreported is to be reported to a network by an event-based acknowledgement information in a radio block period;

determine that the acknowledgment status of the first downlink data block is to be reported by a polled acknowledgment response to be sent in response to the poll received from a network in the radio block period; and in response to determining that the acknowledgment status of the first downlink data block is to be reported by both the polled acknowledgment response and the event-based acknowledgement information in the radio block period:

send the polled acknowledgment response to report the acknowledgment status of the first downlink data block; and refrain from sending the event-based acknowledgment information; and a memory to store the acknowledgment status of the first downlink data block.

16. The mobile station as defined in claim 15, wherein the event-based acknowledgment information comprises at least one of: (1) a piggy-backed ACK/NACK (PAN) field to be sent by the mobile station according to an enhanced general packet radio service (EGPRS) event-based fast ACK/NACK reporting (FANR) procedure, or (2) an ACK/NACK field to be sent by the mobile station in an EGPRS ACK/NACK control message.

17. The mobile station as defined in claim 15, wherein the polled acknowledgment information comprises at least one of: (1) a PAN field to be sent by the mobile station according to an EGPRS polled FANR procedure, or (2) an ACK/NACK field to be sent by the mobile station in an EGPRS ACK/NACK control message.

18. The mobile station as defined in claim 15, wherein to classify the first downlink data block as unreported, the processor is to set an element of a receive state array to an unreported state, the element corresponding to the first downlink data block.

19. The mobile station as defined in claim 15, wherein the first downlink data block is to be received before the poll.

20. The mobile station as defined in claim 15, wherein the first downlink data block is to be received after the poll.

* * * * *